United States Patent
Kosaka

(10) Patent No.: US 10,771,703 B2
(45) Date of Patent: Sep. 8, 2020

(54) IMAGE PHOTOGRAPHY APPARATUS

(71) Applicants: Sony Corporation, Tokyo (JP); Sony Mobile Communications, Inc., Tokyo (JP)

(72) Inventor: Junichi Kosaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 778 days.

(21) Appl. No.: 14/823,501

(22) Filed: Aug. 11, 2015

(65) Prior Publication Data

US 2015/0350559 A1 Dec. 3, 2015

Related U.S. Application Data

(63) Continuation of application No. 13/545,147, filed on Jul. 10, 2012, now Pat. No. 9,137,444.

(60) Provisional application No. 61/539,224, filed on Sep. 26, 2011.

(51) Int. Cl.
*H04N 5/232* (2006.01)
*H04N 5/262* (2006.01)
*G06T 15/30* (2011.01)
*G06F 3/0354* (2013.01)

(52) U.S. Cl.
CPC ..... *H04N 5/23293* (2013.01); *G06F 3/03547* (2013.01); *G06T 15/30* (2013.01); *H04N 5/23296* (2013.01); *H04N 5/2628* (2013.01); *G06T 2215/16* (2013.01)

(58) Field of Classification Search
CPC ........... H04N 5/23293; H04N 5/23296; H04N 5/2628; G06T 2215/16; G06T 15/30; G06F 3/03547
See application file for complete search history.

(56) References Cited

U.S. PATENT DOCUMENTS

| | | |
|---|---|---|
| 2002/0073111 A1 | 6/2002 | Heyliger |
| 2005/0012833 A1 | 1/2005 | Yokota et al. |
| 2005/0041111 A1 | 2/2005 | Matsuoka |
| 2005/0122402 A1 | 6/2005 | Kumaki |
| 2007/0279492 A1 | 12/2007 | Ohnishi |

(Continued)

FOREIGN PATENT DOCUMENTS

| | | |
|---|---|---|
| EP | 1 855 465 A2 | 11/2007 |
| EP | 2 207 342 A2 | 7/2010 |

(Continued)

OTHER PUBLICATIONS

Partial European Search Report dated Jan. 31, 2013 in Patent Application No. 12180794.5.

(Continued)

*Primary Examiner* — Lin Ye
*Assistant Examiner* — John H Morehead, III
(74) *Attorney, Agent, or Firm* — Xsensus LLP

(57) ABSTRACT

An information processing apparatus that includes a camera unit including an imaging sensor that captures an image; a display that displays an image; and a processor that: clips an image region having a size corresponding to a photography zoom power from an image captured by the camera unit; adjusts a clipping position at a time of clipping the image region from the image; and controls the display to display the clipped image region on the display.

20 Claims, 28 Drawing Sheets

(56) References Cited

U.S. PATENT DOCUMENTS

| | | | |
|---|---|---|---|
| 2008/0279480 A1* | 11/2008 | Inamoto | H04N 1/3875 382/305 |
| 2009/0109243 A1* | 4/2009 | Kraft | G06F 3/0481 345/660 |
| 2010/0026721 A1* | 2/2010 | Park | H04N 5/44591 345/660 |
| 2010/0067891 A1* | 3/2010 | Uenishi | G03B 13/36 396/104 |
| 2010/0141826 A1* | 6/2010 | Thorn | G03B 13/32 348/345 |
| 2010/0157105 A1* | 6/2010 | Yokohata | H04N 5/23219 348/240.3 |
| 2010/0173678 A1* | 7/2010 | Kim | H04N 5/23296 455/566 |
| 2010/0232704 A1* | 9/2010 | Thorn | H04N 5/232 382/195 |
| 2010/0277620 A1* | 11/2010 | Iijima | H04N 5/347 348/240.1 |
| 2011/0007175 A1* | 1/2011 | Fujita | H04N 5/23287 348/222.1 |
| 2011/0013049 A1* | 1/2011 | Thorn | H04N 1/00392 348/240.3 |
| 2011/0019239 A1* | 1/2011 | Kojima | H04N 5/23293 358/401 |
| 2011/0043662 A1 | 2/2011 | Kim | |
| 2012/0033127 A1* | 2/2012 | Uenishi | H04N 5/23293 348/345 |
| 2014/0129995 A1* | 5/2014 | Coddington | G06F 3/04883 715/863 |

FOREIGN PATENT DOCUMENTS

| | | |
|---|---|---|
| EP | 2 267 994 A1 | 12/2010 |
| JP | 6-350897 A | 12/1994 |
| JP | 2003-289465 A | 10/2003 |
| JP | 2007-129480 A | 5/2007 |
| JP | 2008-123416 | 5/2008 |
| WO | WO 2009/053833 A1 | 4/2009 |
| WO | WO 2010/102678 A1 | 9/2010 |
| WO | WO 2011/007264 A1 | 1/2011 |

OTHER PUBLICATIONS

Extended European Search Report dated Apr. 16, 2013 in Patent Application No. 12180794.5.
Extended European Search Report dated Jan. 18, 2019, issued in European Patent Application No. 18174195.

* cited by examiner

IMAGE PHOTOGRAPHY APPARATUS

CROSS REFERENCE TO RELATED APPLICATION

This application is a continuation of U.S. Ser. No. 13/545,147, filed Jul. 10, 2012, the entire contents of which is incorporated herein by reference. U.S. Ser. No. 13/545,147 claims the benefit of priority under 119(e) of U.S. Provisional Patent Application Ser. No. 61/539,224 filed on Sep. 26, 2011.

BACKGROUND

Field of the Disclosure

The present disclosure relates to an image photography apparatus whereby a photographer can enlarge and image a desired subject and so forth according to a zoom operation.

Description of Related Art

Heretofore, digital cameras, whereby a photographer can image a desired subject and so forth, allow the photographer to enlarge and shoot a desired subject within real world using so-called optical zoom or digital zoom. The optical zoom realizes enlargement of an image such as the desired subject and so forth by adjusting the photography field angle using a lens optical system to change the photography range. On the other hand, the digital zoom realizes enlargement of an image such as the desired subject and so forth by electronically enlarging an input image that an imaging sensor has imaged, and clipping an image having an object size from the enlarged image thereof, or by clipping a portion of the input image, and enlarging the clipped image thereof. Note that there are many digital cameras which include no optical zoom function but the digital zoom function alone.

Also, digital cameras are configured so as to display an image enlarged by the zoom function, for example, on a viewfinder or the like as a preview image. Thus, the photographer can recognize which portion within real world is enlarged by viewing the preview image displayed on the viewfinder thereof.

Additionally, for example, Japanese Unexamined Patent Application Publication No. 2008-123416 describes a subject tracing program which extracts multiple regions having high similarity from the frames of an input image using template matching, classifies the extracted regions into a region determining a subject position within the input image, and regions other that, determines a subject position based on a position within the input image of a region classified to determine the subject position, and traces the subject position thereof between frames, thereby tracing the motion of a subject between multiple frame images.

SUMMARY

Incidentally, while photography imaging using the digital camera, a photographer moves the camera itself, changes the direction of the camera, or the like, whereby the photography range according to this camera can be changed. Therefore, for example, in the event of a desired subject being shot, the photographer moves the photography range of this camera by movement or directional change or the like of the camera, whereby the position of a subject image on a preview image can also be adjusted to a desired position within the display image thereof.

However, in the event of the enlargement photography by the digital zoom function being performed, if movement, directional change, or the like of the camera is performed, the movement amount or directional change amount is reflected in the movement of the position of the subject image on the preview image according to the scale of enlargement according to the digital zoom. That is to say, in the event of the enlargement photography being performed, even if the camera is moved a little, or the direction of the camera is changed a little, the position of the subject image within the preview image is greatly changed.

Therefore, in the event of performing enlargement photography of a desired subject using an existing digital camera and the digital zoom function, it is difficult work for the photographer to place the position of a desired subject image in the preview image at an intended position by movement, directional change, or the like of the camera. Also, in the event of enlargement photography such as the digital zoom function being performed, if movement, directional change, or the like of the camera is performed, so-called shaking readily occurs, and accordingly, further difficult work is imposed on the photographer to place the desired subject image in an intended position.

According to such situations, the present inventor recognizes necessity to allow the photographer to perform photography by placing a desired subject image in a position where the photographer intends easily and in a sure manner without demanding the photographer to perform the work of movement or directional change of a camera to perform fine adjustment of the photography range of the camera in the event of enlargement photography being performed using the digital zoom function for example.

According to a first embodiment, the disclosure is directed to an information processing apparatus that includes a camera unit including an imaging sensor that captures an image; a display that displays an image; and a processor that: clips an image region having a size corresponding to a photography zoom power from an image captured by the camera unit; adjusts a clipping position at a time of clipping the image region from the image; and controls the display to display the clipped image region on the display.

According to another embodiment, the disclosure is directed to a method performed by an information processing apparatus, the method comprising: capturing an image by a camera unit including an imaging sensor; displaying, by a display, the image; clipping an image region having a size corresponding to a photography zoom power from the image; adjusting a clipping position at a time of clipping the image region from the image; and controlling the display to display the clipped image region.

According to another embodiment, the disclosure is directed to a non-transitory computer-readable medium including computer-program instructions, which when executed by an information processing apparatus, cause the information processing apparatus to perform a method comprising: capturing an image by a camera unit including an imaging sensor; displaying, by a display, the image; clipping an image region having a size corresponding to a photography zoom power from the image; adjusting a clipping position at a time of clipping the image region from the image; and controlling the display to display the clipped image region.

DETAILED DESCRIPTION

Description will be made below regarding an image photography apparatus, an image photography control program, and an image photography control method, which serve as an embodiment of the present disclosure, and an embodiment of a recording medium in which the image photography control program is recorded, with reference to the drawings. Note that, with the following description, a high-performance personal digital assistant including a digital camera unit including a digital zoom function, a display panel unit which can serve as a viewfinder, and a capacitance type touch panel unit which can detect contact or proximity or the like of an external conductor such as a photographer's finger or the like, and also cover generally the entire screen of the display panel unit will be referred as an example of an image photography apparatus according to an embodiment of the present disclosure. It goes without saying that the following embodiment is just an example, and the present disclosure may be applied to other various types of electronic devices including a digital camera or a digital camera function, for example.

Figure 1:
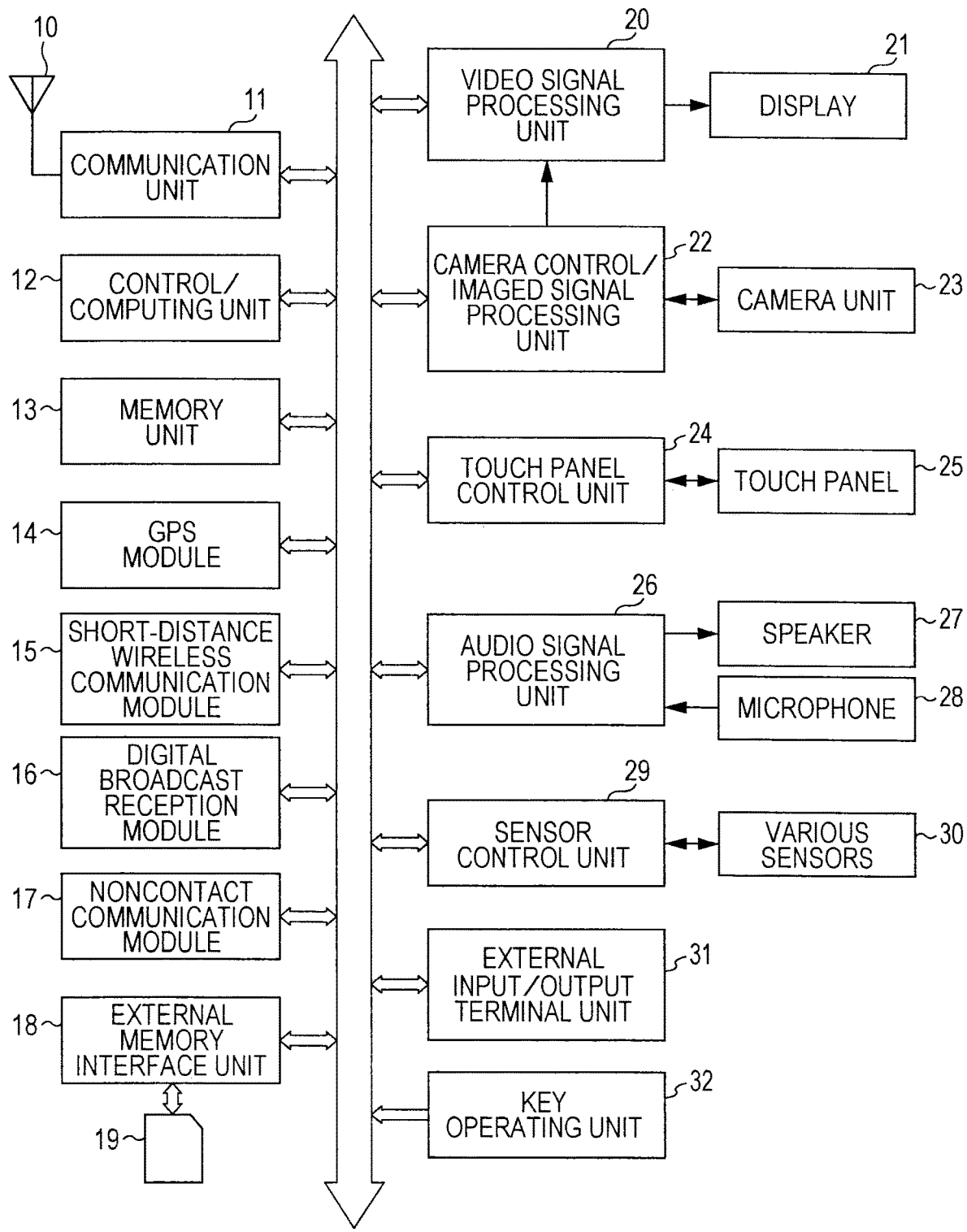
FIG. 1 is a block diagram illustrating a schematic internal configuration example of a highly-functional personal digital assistant which is an image photography apparatus according to the present embodiment.

Schematic Block Configuration of Image Photography Apparatus of Present Embodiment FIG. 1 illustrates an internal block configuration example of a highly-functional personal digital assistant which is an image photography apparatus according to the present embodiment.

In FIG. 1, a communication antenna 10 is, for example, a built-in antenna, and performs transmission/reception of a telephone call or e-mail through a cellular phone network or public wireless communication network, downloading of various programs, and transmission/reception of signal electric waves for connecting to the Internet or the like. A communication unit 11 includes an antenna circuit and a transmission/reception circuit, and performs the frequency conversion, modulation, demodulation, and so forth of a transmission/reception signal through the cellular phone network or public wireless communication network. Though details will be described later, with the present embodiment, examples of a program obtained via the communication antenna 10 and communication unit 11 include a camera application program, an image photography control program, according to the present embodiment. The image photography control program according to the present embodiment is a program for executing a digital camera function according to the present embodiment, control of an image clipping position at the time of enlargement using later-described digital zoom, and processing for controlling an image clipping position while performing tracing using a later-described object tracking technique, and so forth. This image photography control program may be included in a camera application program, or may separately be prepared.

A speaker 27 is a speaker provided to the personal digital assistant according to the present embodiment, and is used for music playback, receiver sound output, ringer tone (ring tone) output, and so forth. A microphone 28 is used for collection of external audio, collection of transmitter sound, and so forth. An audio signal processing unit 26 is configured of an amplifier circuit for the speaker 27, an amplifier circuit for the microphone 28, a decompression decoding circuit for subjecting audio data subjected to compressing encoding supplied from a later-described control/computing unit 12 to decompression decoding, a digital/analog conversion circuit for converting digital audio data after this decompression decoding into an analog audio signal, an analog/digital conversion circuit for converting the analog audio signal input from the microphone 27 into digital audio data, and a compression encoding circuit for subjecting this digital audio data to compression encoding, and so forth.

A key operating unit 32 is configured of hard keys provided on the casing of the personal digital assistant according to the present embodiment, peripheral circuits thereof, and so forth. This key operating unit 32 converts hard key operation input by a user into an electric signal, amplifies and converts the operation input signal thereof from analog to digital, and transmits the operation input data after analog/digital conversion thereof to the control/computing unit 12. Also, with the present embodiment, in addition to a shutter key used at the time of photography by a camera control unit 23, various keys available for a digital camera may be proved to the key operating unit 32, such as a zoom operation, an exposure setting operation, a shutter speed setting operation, and so forth, as appropriate.

An external memory interface unit 18 is configured of a slot for external memory from/on which external memory 19 made up of a semiconductor storage medium, or the like is detached/mounted, an interface circuit for external memory data communication, and so forth. With the personal digital assistant according to the present embodiment, various types of data, or various types of programs can be obtained via a recording medium such as the external memory 19 inserted into this external memory interface unit 18. Note that, with the present embodiment, examples of various programs obtained via this external memory 19 include a camera application program according to the present embodiment, and an image photography control program according to the present embodiment may be included in this camera application program or may separately be prepared.

An external input/output terminal unit 31 is configured of a cable connection connector and an interface circuit for external data communication, for example, at the time of performing data communication through a cable, a charge terminal at the time of charging an internal battery via a power supply cable or the like, and an interface circuit for charge thereof, and so forth. The personal digital assistant according to the present embodiment is configured so as to obtain various types of data and various programs from an external device connected to this external input/output terminal unit 31. Note that, with the present embodiment, various programs obtained through this external input/output terminal unit 31 can include a later-described camera application program according to the present embodiment, an image photography control program included in this camera application program or separately prepared, and so forth. Note that the camera application program and image photography control program according to the present embodiment may be recorded in a disc-shaped recording medium or another recording medium or the like. In this case, for example, the program read out from this recording medium by a recording media playback device included in a personal computer or the like may be supplied to the external input/output terminal 31. It goes without saying that an arrangement may be made wherein a recording media playback device is directly connected to the external input/output terminal 31, the camera application program or image photography control program read out by the playback device thereof is supplied to the personal digital assistant according to the present embodiment.

A short-distance wireless communication module 15 is configured of a communication antenna for short-distance wireless electric waves such as a wireless LAN, Bluetooth (registered trademark) or the like, and a short-distance wireless communication circuit. The camera application program and image photography control program according to the preset embodiment may be obtained via this short-distance wireless communication module 15.

A digital broadcast reception module 16 is configured of an antenna and tuner for reception such as so-called digital television broadcasting or digital radio broadcasting or the like. This digital broadcast reception module 16 can receive not only a digital broadcast of one channel but also digital broadcasts of multiple channels at the same time. Also, this digital broadcast reception module 16 can also receive data multiplexed into a digital broadcast. Note that an arrangement may be made wherein the digital broadcast data received at this digital broadcast reception module 16 is, for example, compressed by the control/computing unit 12, and then stored in memory unit 13 or the like. Also, the camera application program and image photography control program according to the preset embodiment may be broadcasted as one of this digital broadcast data. In this case, these programs are extracted from the digital broadcast data received at the digital broadcast reception module 16 and taken into the personal digital assistant according to the present embodiment.

A noncontact communication module 17 performs noncontact communication, for example, used for so-called RFID (Radio Frequency-Identification) or a noncontact IC card or the like via a noncontact communication antenna. The camera application program and image photography control program according to the preset embodiment may be obtained via this noncontact communication module 17.

A GPS (Global Positioning System) module 14 includes a GPS antenna, and obtains the latitude and longitude of the current position of the terminal itself using the GPS signals from a GPS geodetic satellite. The GPS data (information representing the latitude and longitude) obtained by this GPS module 14 is transmitted to the control/computing unit 52. Thus, the control/computing unit 12 can recognize the current position and movement of the terminal itself.

Various sensors 30 are made up of, as an example, an acceleration sensor, an inclination sensor, an orientation sensor, a temperature sensor, a humidity sensor, an illuminance sensor, and so forth.

A sensor control unit 29 obtains, for example, acceleration, inclination, orientation, temperature, humidity, illuminance, and so forth from the output signals from the various sensors 30. Note that the sensor control unit 29 also includes various sensor drivers for controlling the operation of the various sensors 30.

A camera unit 23 includes an imaging sensor for photographing still images and moving images, an optical system for forming a subject image on the imaging sensor thereof, an autofocus mechanism for driving the lens of the optical system to perform automatic focusing, an auto iris mechanism for driving the diaphragm of the optical system to perform automatic diaphragm adjustment, a shutter speed adjustment mechanism for adjusting the shutter speed using a mechanical type or electronic type or the like, a shaking correction mechanism for correcting so-called shaking, a light and so forth for emitting shooting auxiliary light, driving circuits for driving these mechanisms, and so forth. Note that the optical system of the camera unit 23 may include an optical zoom mechanism.

A camera control/imaged signal processing unit 22 controls various operations at the time of shooting using the camera unit 23, such as imaging operation control at the imaging sensor of the camera unit 23, driving control of the lens of the optical system, autofocus control for automatic focusing, auto iris control, shutter speed control, shaking correcting mechanism, emitting light control of shooting auxiliary light, and so forth. Also, with the present embodiment, the camera control/imaged signal processing unit 22 generates image data used for display from the imaging signals according to the imaging sensor of the camera unit 23, and supplies to a video signal processing unit 20. Also, with the present embodiment, the image data generated at this camera control/imaged signal processing unit 22 may be stored in the memory unit 13 or external memory 19 connected to the external memory interface unit 18 after being transmitted to the control/computing unit 12, and compressed.

The video signal processing unit 20 performs decompression decoding processing for subjecting the video data subjected to compression encoding supplied from the control/computing unit 12 to decompression decoding, processing for displaying the digital video after this decompression decoding, or the digital broadcast video data received at a digital broadcast reception module 56 on the display panel 21, processing for displaying the image to be played read out from the memory unit 13 or the like on the display panel 21, and so forth. Also, this video signal processing unit 20 also generates video signals for displaying the desktop image, various menu images, character input screen, photo image, composited image, virtual key, virtual button image, and so forth supplied from the control/computing unit 12, and displays these images on the display panel 21. Note that the display panel 21 is made up of a liquid crystal panel or organic EL panel or the like, for example.

Also, with the present embodiment, the video signal processing unit 20 performs processing for displaying the input image imaged by the imaging sensor of the camera unit 23, and supplied from the camera control/imaged signal processing unit 22 on the display panel 21 as a preview image, processing for generating an enlarged image for digital zoom using the image data from the camera control/imaged signal processing unit 22, and so forth. Note that, though details will be described later, the video signal processing unit 20 is configured so as to execute processing for clipping a desired image portion from the input image imaged by the imaging sensor of the camera unit 23 and supplied via the camera control/imaged signal processing unit 22, and enlarging the clipped image thereof as processing for generating an enlarged image for digital zoom. Also, though details will be described later, the video signal processing unit 20 is configured so as to execute processing for taking an image portion including a desired object image (later-described object reference image) being traced using a so-called object tracking technique as the clipped image at the time of clipping the desired image portion from the input image obtained by imaging of the camera unit 23. Note that, with the present embodiment, an example has been shown wherein the video signal processing unit 20 performs generation of a preview image, and processing for generating an enlarged image for digital zoom, but these processes may be performed by the camera control/imaged signal processing unit 22, or may be performed by the control/computing unit 12, or may be performed by these units cooperating.

A touch panel 25 is placed in the panel front surface of the display panel 21, and also has a size covering generally the entire display panel surface. This touch panel 25 has a configuration wherein multiple transparent electrode patterns are arrayed in the X-Y direction on the panel surface made up of transparent sensor glass, and is a device capable of detecting that an external conductor such as the user's finger contacts or comes close to the panel surface, and outputting the X-Y coordinate position information on the panel surface at the time of the external conductor contacting or coming close to the panel surface.

A touch panel control unit 24 controls the operation and scanning of the touch panel 25, and also performs determination whether or not the external conductor contacts or comes close to the touch panel 25, calculation of a contact position or close position, calculation of how much distance the external conductor comes close to the panel surface at the time of proximity, calculation of duration time of a contact or close state, a time interval wherein contact or proximity has been detected, the movement direction, movement speed, movement path, and so forth of the external conductor or the like in a contact or close state, based on capacitance values detected by the touch panel 25 and X-Y coordinate position information detected by the touch panel 25. The touch panel control unit 24 then transmits the data obtained by these detection, computation, calculation, and so forth to the control/computing unit 12. Note that the touch panel control unit 24 also includes a touch panel driver for controlling the operation and scanning of the touch panel 25.

The memory unit 13 is made up of built-in memory provided to the inside of this terminal, and detachable card-shaped memory. Examples of the detachable card-shaped memory include a card in which so-called SIM (Subscriber Identity Module) information or the like is stored. The built-in memory is made up of ROM (Read Only Memory) and RAM (Random Access Memory). The ROM stores an OS (Operating System), a control program for the control/computing unit 12 controlling the units, various initial set values, dictionary data, letter prediction conversion dictionary data, various types of audio data, and also various programs including a text editor, an HTML editor, a mailer, an image editor, the camera application program and image photography control program according to the present embodiment, and so forth. This ROM includes rewritable ROM such as NAND-type flash memory or EEPROM (Electrically Erasable Programmable Read-Only Memory), and is configured so as to save e-mail data, the data of a phone book or mail address book, the data of a still image or moving image, and additionally various user set values, and so forth. The RAM stores data as a work area or buffer area as appropriate when the control/computing unit 12 performs various types of data processing.

The control/computing unit 12 is made up of a CPU (Central Processing Unit), controls the units such as the communication unit 11, video signal processing unit 20, camera control/imaged signal processing unit 22, touch panel control unit 24, audio signal processing unit 26, sensor control unit 29, GPS module 14, short-distance wireless communication module 15, digital broadcast reception module 16, noncontact communication module 17, external memory interface unit 18, external input/output terminal unit 31, key operating unit 32, and so forth, and performs various calculations as appropriate. Also, the control unit/computing unit 12 executes the control program stored in the memory unit 13, the text editor, HTML editor, mailer, image editor, the camera application program and image photography control program according to the present embodiment, and so forth. Also, with the present embodiment, the control/computing unit 12 executes the image photography control program according to the present embodiment to control the video signal processing unit 20, thereby causing the video signal processing unit 20 to perform the processing for displaying a preview image, processing for generating an enlarged image for digital zoom, and so forth. Note that description will be made later regarding the flow of the processing for the control/computing unit 12 executing the image photography control program according to the present embodiment to control the video signal processing unit 20 to perform the processing for displaying a preview image, or processing for generating an enlarged image for digital zoom.

Additionally, the personal digital assistant according to the present embodiment naturally includes various components provided to a common personal digital assistant, such as a clock unit for measuring time and point-in-time, a battery for supplying power to the units, a power management IC for controlling power thereof, and so forth.

[Overview of Processing for Generating and Displaying Enlarged Image at Time of Digital Zoom]

Figure 2A:
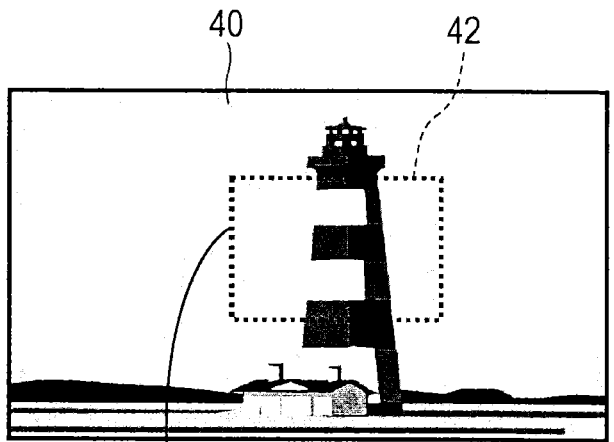
FIGS. 2A, 2B and 2C are diagrams used for brief description regarding enlarged image generating and displaying processing at the time of digital zoom in the present embodiment.
Figure 2B:
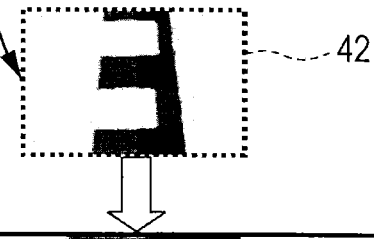
Figure 2C:
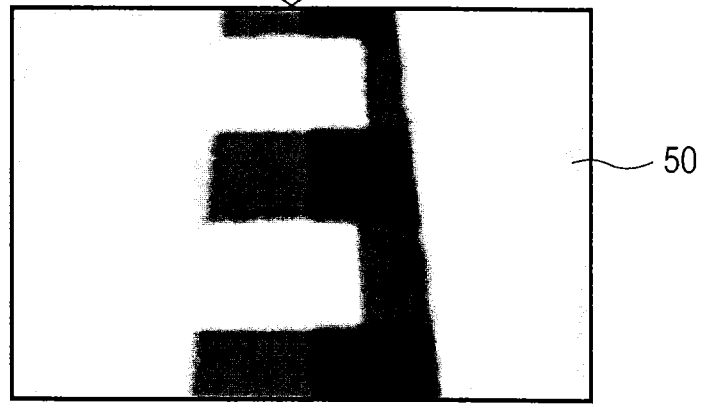

With the present embodiment, as described above, in the event of enlarged display of an image using the digital zoom, the video signal processing unit 20 clips an image region (42) having a size corresponding to a desired zoom power as shown in (B) in FIG. 2 from the input image 40 as shown in (A) in FIG. 2 imaged by the imaging sensor of the camera unit 23 and supplied via the camera control/imaged signal processing unit 22, enlarges the clipped image 42 thereof, and displaying this on the display panel 21 as a preview image 50 as shown in (C) in FIG. 2.

Here, as described above it is very difficult work for the photographer to place the position of a desired subject image on the preview image in an intended position, for example, by movement or directional change or the like of the personal digital assistant serving as an image photography apparatus, or the like.

Therefore, with the present embodiment, it is realized by adjusting the clipping position at the time of clipping an image region having a size corresponding to the zoom power from the input image 40 for the photographer to place the position of a subject image displayed on the preview image 50 in an intended position.

Figure 3:
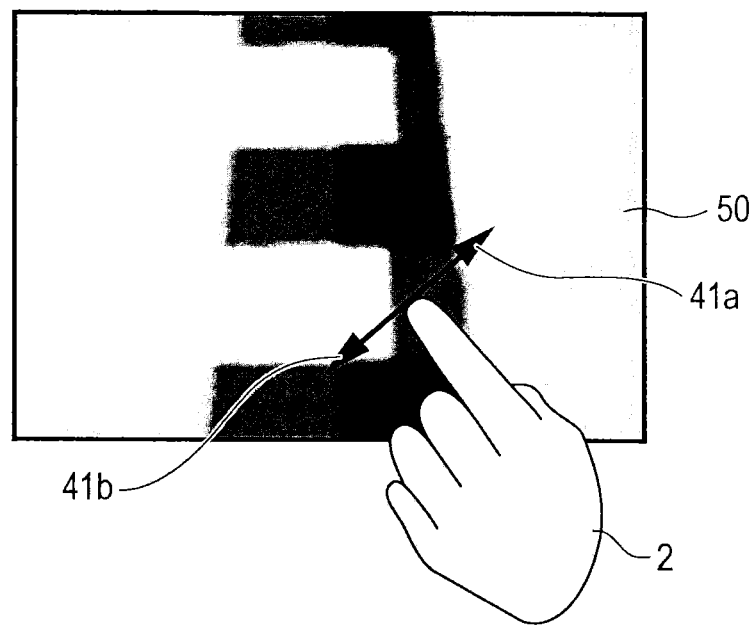
FIG. 3 is a diagram illustrating an example wherein, with the present embodiment, in a state in which a preview image is displayed on a display panel, for example, a photographer is contacting a finger on a touch panel and moving in an arrow direction.
Figure 4:
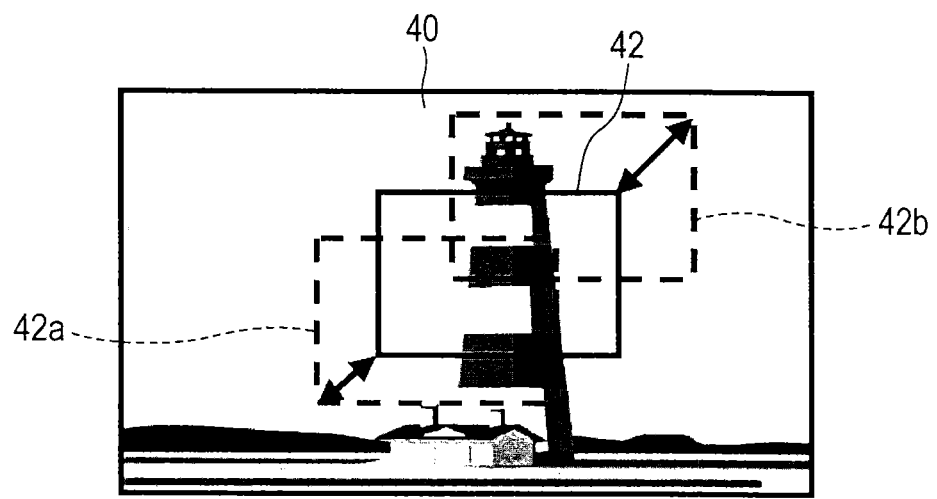
FIG. 4 is a diagram illustrating a scene where, with the present embodiment, in response to specification of the arrow direction in FIG. 3 being performed, a clipping position at the time of clipping an image from an input image is moved.

Specifically, in a state in which the preview image 50 is displayed on the display panel 21, for example, in the event that the photographer contacts a finger of the hand 2 on the touch panel 25 to move in the arrow direction in FIG. 3 for example, the personal digital assistant according to the present embodiment moves, as shown in FIG. 4, the clipping position at the time of clipping an image region having a size corresponding to the zoom power from the input image 40 according to the movement direction of the contact point of the finger on the touch panel 25 and movement distance thereof. To make description more specifically, as shown in FIG. 4, in the event that the photographer has moved the finger of the hand 2, for example, in an arrow direction 41a in FIG. 3, the personal digital assistant according to the present embodiment moves, as shown in FIG. 4, the clipping position at the time of clipping the image region from the input image 40 according to the movement direction 41a of the contact point by the finger on the touch panel 25 and movement distance thereof, such as a clipped image 42a from the position of the clipped image 42. Similarly, for example, in the event that the photographer has moved the finger of the hand 2 in the arrow direction 41b in FIG. 3, the personal digital assistant according to the present embodiment moves, as shown in FIG. 4, the clipping position at the time of clipping the image region from the input image 40 according to the movement direction 41b of the contact point by the finger on the touch panel 25 and movement distance thereof, such as a clipped image 42b from the position of the clipped image 42.

In this way, in a state in which the preview image 50 is displayed on the display panel 21, the personal digital assistant according to the present embodiment can move the clipping position at the time of clipping the image region from the input image 40 according to the direction and distance that the photographer specified on the touch panel 25, enlarge the clipped image due to movement thereof, and display as a preview image. Thus, according to the present embodiment, the photographer can perform photography for placing a desired subject image in an intended position at the time of the digital zoom easily and in a sure manner by an intuitive operation such as the directional and distance instructions on the display panel 21 where the preview image 50 is displayed, without having to perform the work of moving the camera or changing the direction, for example.

Note that, with the present embodiment, though an example has been shown wherein the direction and distance of the image clipping position are specified by the photographer operating the touch panel 25, the direction and distance of the image clipping position may be specified by operations a directional specification key provided to the key operating unit 32, or the like, for example. Also, while a specific display example will be described later, display may be made on the display panel 21 indicating the entire input image before enlargement, and the image clipping position, along with the preview image 50.

[Overview from Camera Activation to Generation of Zoom-Enlarged Image and Image Saving at Time of Shooting of Still Image]

Description will be made regarding overview from camera unit activation to generation of an enlarged image according to digital zoom, and saving of the enlarged image thereof at the time of a still image being shot with the personal digital assistant according to the present embodiment, with reference to FIG. 5 through FIG. 10.

Figure 5:
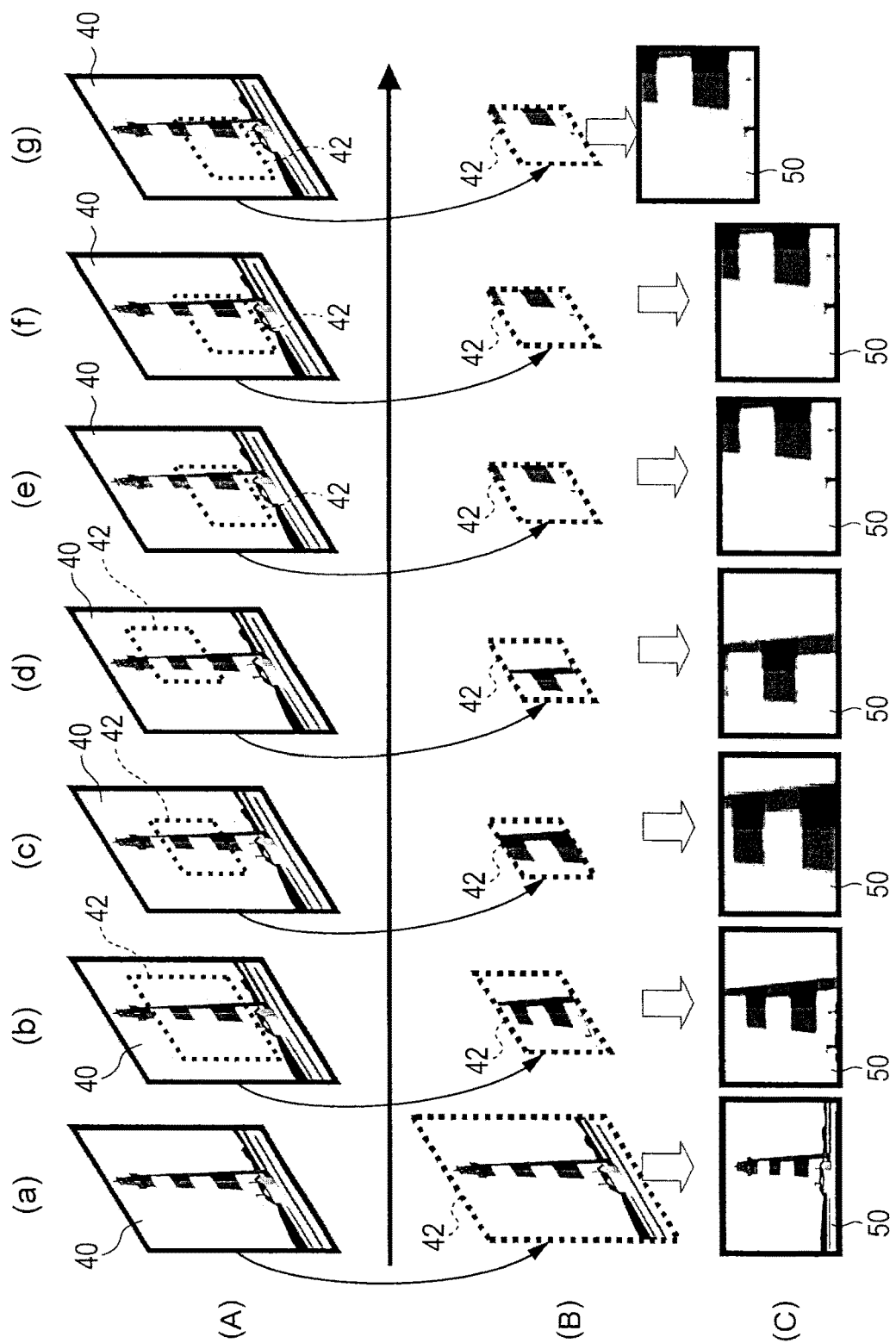
FIG. 5 is a diagram used for brief description from activation of a camera at the time of shooting of a still image to generation and saving of a zoom enlarged image in the present embodiment.

In FIG. 5, column (a) in row (A) to column (g) in row (A) in the drawing indicate the input images 40 shot by the imaging sensor of the camera unit 23 and supplied from the camera control/imaged signal processing unit 22 to the video signal processing unit 20. Also, column (a) in row (B) to column (g) in (B) row in FIG. 5 indicate the clipped images 42 from column (a) in row (A) to column (g) in row (A) in FIG. 5 clipped from the input image 40. Also, column (a) in row (C) to column (g) in row (C) in FIG. 5 indicate the preview images 50 displayed on the display panel 21 where the clipped images 42 from column (a) in row (B) to column (g) in row (B) in FIG. 5 are enlarged.

Also, row (a) in FIG. 5 indicates the input image 40, clipped image 42, and preview image 50 at the time of the power of the digital zoom being 1×, i.e., at the time of no enlargement being performed after camera activation. That is to say, after camera activation, in the event that no digital zoom has been started, the preview image 50 is taken as the image having the same size as the input image 40.

Figure 6A:
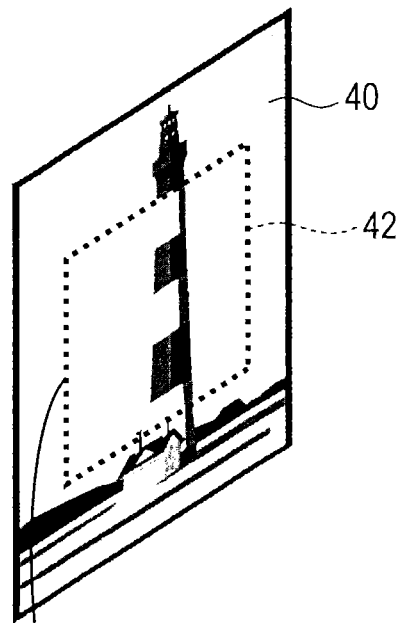
FIGS. 6A, 6B and 6C are diagrams illustrating an example of an input image, a clipped image, and a preview image shown by extracting column (b) in FIG. 5 in the present embodiment.
Figure 6B:
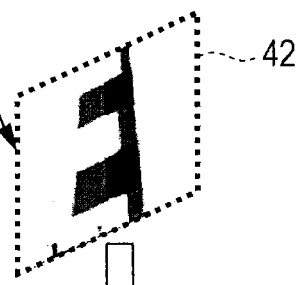
Figure 6C:
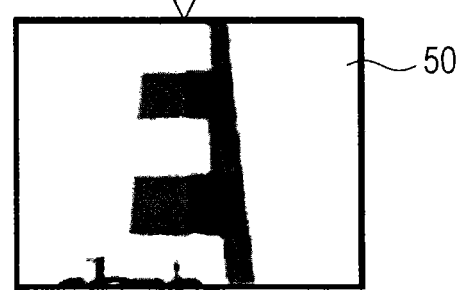

Column (b) in FIG. 5 indicates, after activation of the camera unit 23, the input image 40 immediately after the digital zoom is started, the clipped image 42 clipped from the input image 40 by enlargement power set as the initial value at the time of start of the digital zoom, and the preview image 50 enlarged therefrom. Specifically, at the time of start of the digital zoom, the personal digital assistant according to the present embodiment takes the center coordinates (x, y)=(0, 0) of the input image 40 as the center coordinates of the clipped image 42, and also performs clipping of the image with the size according to the zoom power set as the initial value beforehand, and displays the clipped image 42 thereof on the display panel 21 as the preview image 50. Note that FIG. 6 extracts and indicates column (b) in FIG. 5, (A) in FIG. 6 is the input image 40 shown in column (b) in row (A) in FIG. 5, (B) in FIG. 6 is the clipped image 42 shown in column (b) in row (B) in FIG. 5, and (C) in FIG. 6 is the preview image 50 shown in column (b) in row (C) in FIG. 5.

Column (c) in FIG. 5 indicates, at the time of the zoom power being changed greater than the initial value shown in column (b) in FIG. 5, the clipped image 42 to be clipped from the input image 40 according to the zoom power thereof, the clipped image 42 after clipping thereof, and the preview image 50 enlarged therefrom. Specifically, in the event that the zoom power is greater than the initial value, the range clipped from the input image 40 as the clipped image 42 is smaller than the range clipped with the zoom power of the initial value. The clipped image 42 thereof is displayed on the display panel 21, whereby the preview image 50 at the time of this zoom power being greater than the initial value becomes an image of which the scale of enlargement is greater than that of the preview image 50 at the time of the zoom power of the initial value.

Figure 7:
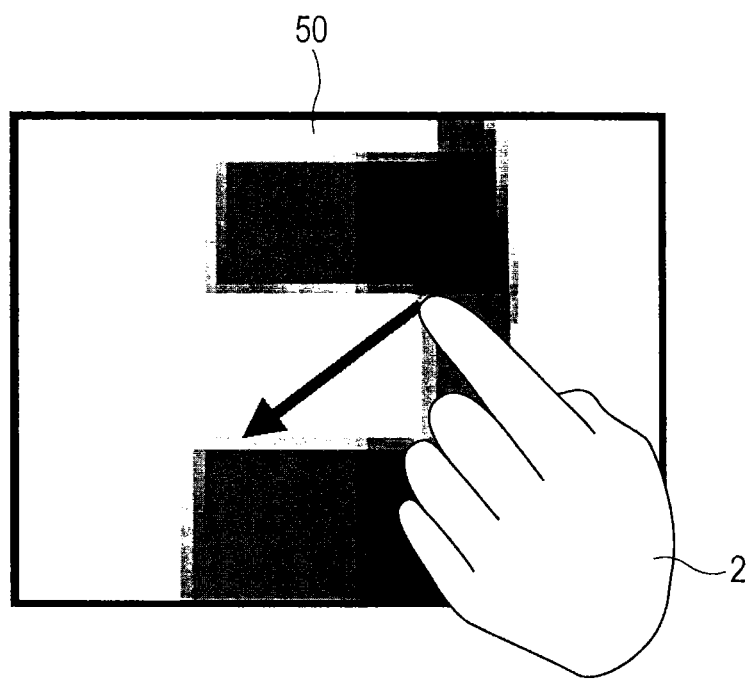
FIG. 7 is a diagram illustrating an example wherein the photographer is specifying a direction for movement of an image clipping position, and distance thereof using a finger as to the preview image shown in (C) column in row (C) in FIG. 5 in the present embodiment.

Next, FIG. 7 illustrates an example wherein the photographer specifies the direction for movement of the image clipping position, and distance thereof using the finger of the hand 2 as to the preview image 50 shown in column (c) in row (C) in FIG. 5. Specifically, this FIG. 7 illustrates an example wherein the contact point of the finger or the like of the photographer on the touch panel 25 is moved by coordinates (Δx1, Δy1) by the direction and distance shown in an arrow in FIG. 7. Note that (Δx1, Δy1) represents the movement amounts of the directions of x-y on the touch panel 25 of the finger. As shown in FIG. 7, in the event of the finger moving by the coordinates (Δx1, Δy1), the center coordinates after movement from the original center coordinates (0, 0) becomes (−αΔx1, −αΔy1). This α represents a scale factor as to the movement distance or movement speed where the contact point such the finger or the like has moved on the touch panel 25, and the value of this α may be determined beforehand, or may optionally be changed by the user. For example, in the event that the a is set to a greater value, the movement distance or movement speed of the image clipping position can be increased as to the movement distance or movement speed of the contact point such as the finger or the like, and conversely, in the event that the a is set to a smaller value, the movement distance or movement speed of the image clipping position can be decreased as to the movement distance or movement speed of the contact point such as the finger or the like.

Figure 8A:
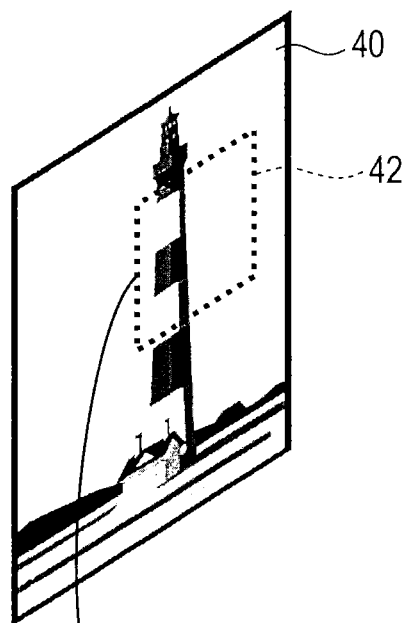
FIGS. 8A, 8B and 8C are diagrams illustrating an example of an input image, a clipped image, and a preview image shown by extracting column (d) in FIG. 5 in the present embodiment.
Figure 8B:
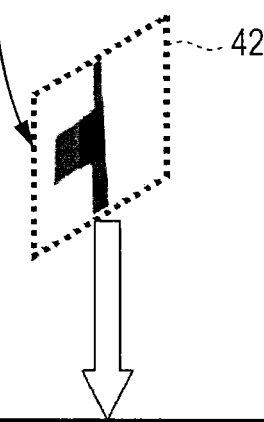
Figure 8C:
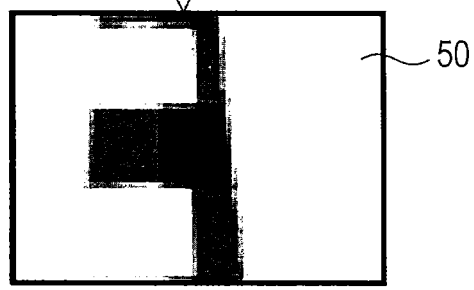

Column (d) in FIG. 5 indicates, after the image clipping position is finely adjusted as shown in FIG. 7, the clipped image 42 to be clipped from the input image 40 at the time of the zoom power being a state greater than the initial value, the clipped image 42 after clipping thereof, and the preview image 50 enlarged therefrom. Specifically, as shown in FIG. 7, the image clipping position is finely adjusted, whereby the position to be clipped from the input image 40 as the clipped image 42 is taken as the position shown in column (d) in row (A) in FIG. 5, and the preview image 50 is taken as an image enlarged from the clipped image 42. Note that FIG. 8 extracts and illustrates column (d) in FIG. 5, (A) in FIG. 8 is the input image 40 shown in column (d) in row (A) in FIG. 5, and (B) in FIG. 8 is the clipped image 42 shown in column (d) in row (B) in FIG. 5, and (C) in FIG. 8 is the preview image 50 shown in column (d) in row (C) in FIG. 5.

Figure 9:
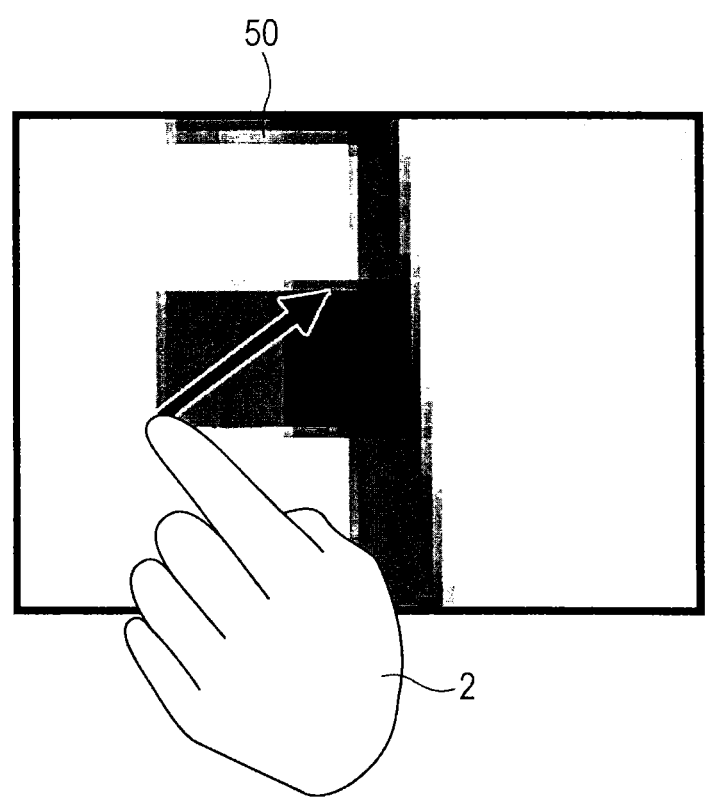
FIG. 9 is a diagram illustrating an example wherein the photographer is specifying a direction for movement of an image clipping position, and distance thereof using a finger as to the preview image shown in column (D) in row (C) in FIG. 5 in the present embodiment.

Next, FIG. 9 illustrates an example wherein the photographer specifies the direction for movement of the image clipping position, and distance thereof using the finger of the hand 2 as to the preview image 50 shown in column (d) in row (C) in FIG. 5. Specifically, this FIG. 9 illustrates an example wherein the contact point of the finger or the like of the photographer on the touch panel 25 is moved by coordinates (Δx2, Δy2) by the direction and distance shown in an arrow in FIG. 9. Note that (Δx2, Δy2) represents the movement amounts of the directions of x-y on the touch panel 25 of the finger. As shown in FIG. 9, in the event of the finger moving by the coordinates (Δx2, Δy2), the center coordinates after movement from the original center coordinates (0, 0) becomes (−αΔx2, −αΔy2). This α represents a scale factor in the same way as described above, and the value of this α may be determined beforehand, or may optionally be changed by the user.

Figure 10A:
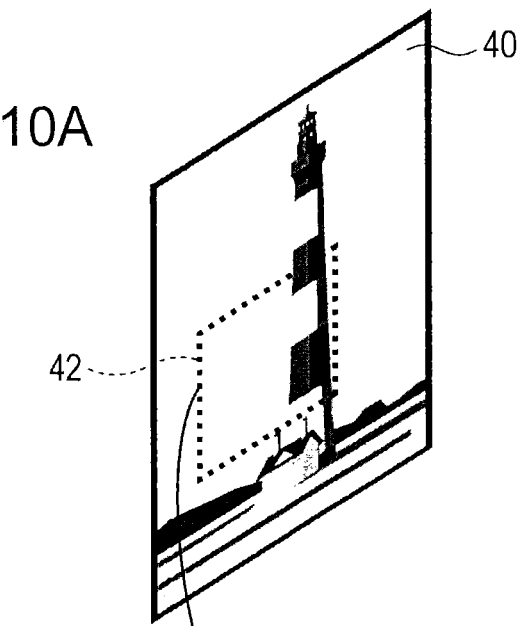
FIGS. 10A, 10B and 10C are diagrams illustrating an example of an input image, a clipped image, and a preview image shown by extracting column (e) in FIG. 5 in the present embodiment.
Figure 10B:
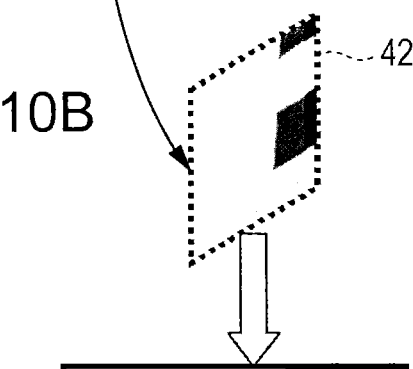
Figure 10C:
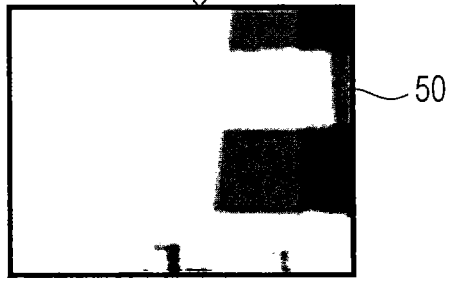

Column (e) in FIG. 5 indicates, after the image clipping position is finely adjusted as shown in FIG. 9, the clipped image 42 to be clipped from the input image 40 at the time of the zoom power being greater than the initial value, the clipped image 42 after clipping thereof, and the preview image 50 enlarged therefrom. Specifically, as shown in FIG. 9, the image clipping position is finely adjusted, whereby the position to be clipped from the input image 40 as the clipped image 42 is taken as the position shown in column (e) in row (A) in FIG. 5, and the preview image 50 is taken as an image enlarged from the clipped image 42. Note that FIG. 10 extracts and illustrates column (e) in FIG. 5, (A) in FIG. 10 is the input image 40 shown in column (e) in row (A) in FIG. 5, and (B) in FIG. 10 is the clipped image 42 shown in column (e) in row (B) in FIG. 5, and (C) in FIG. 10 is the preview image 50 shown in column (e) in row (C) in FIG. 5.

Column (f) in FIG. 5 is the same as column (e) in FIG. 5, and indicates the input image 40, clipped image 42, and preview image 50 immediately before saving of the images in column (g) in FIG. 5.

Column (g) in FIG. 5 illustrates the input image 40 at the time of shooting execution instructions being input, for example, by a shutter key provided to the key operating unit 32 being pressed by the photographer, the clipped image 42 clipped from the input image 40 thereof, and the preview image 50 enlarged from the clipped image 42. In the case of this column (g) in FIG. 5, the preview image 50 becomes a recorded image, and saved, for example, in the memory unit 13 or the like under the control of the control/computing unit 12.

[Flow from Camera Activation to Generation of Zoom Enlarged Image and Saving of Image at Time of Shooting of Still Image]

Figure 11:
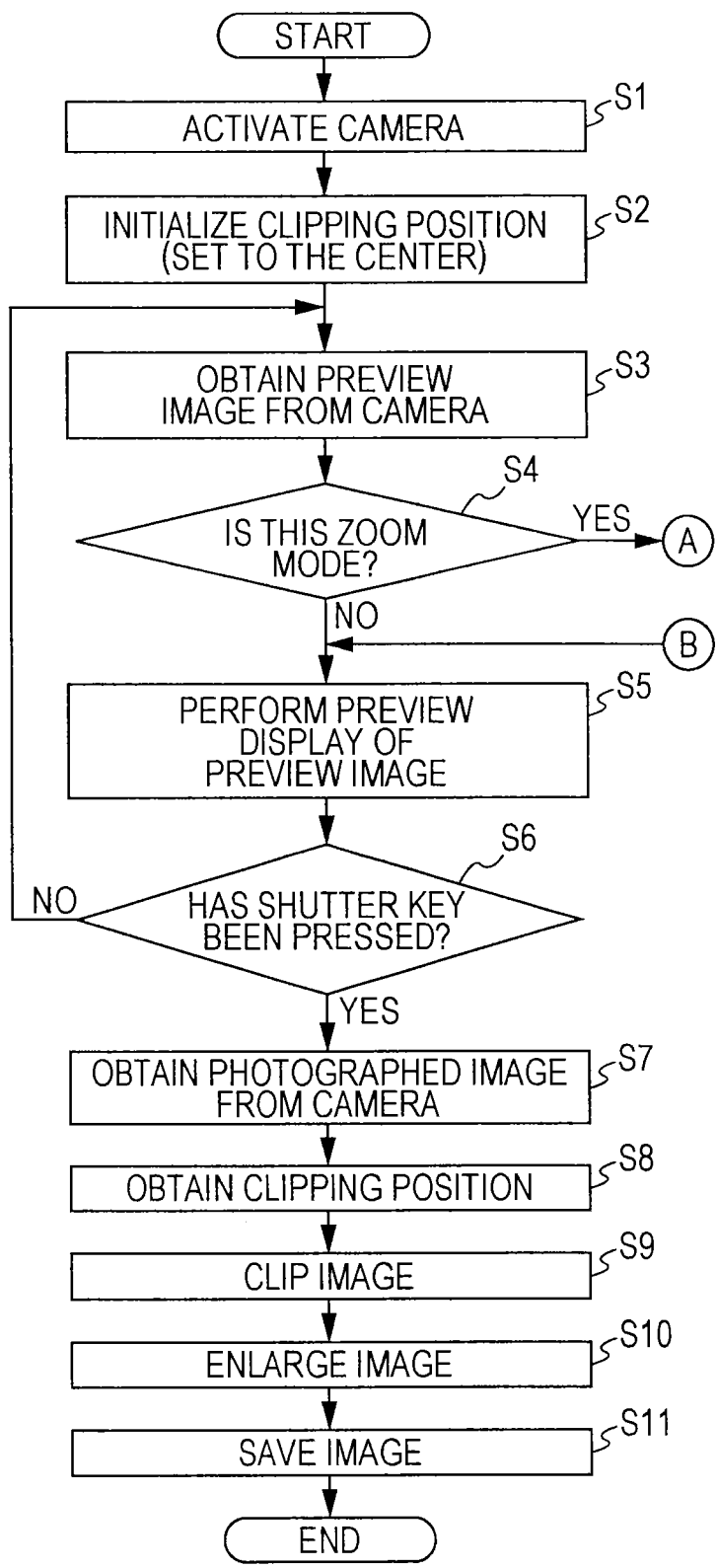
FIG. 11 is a flowchart of a processing portion of camera activation, zoom mode determination, and shutter key press, and thereafter of processing from camera unit activation to enlarged image saving at the time of a still image being shot with the personal digital assistant according to the present embodiment.
Figure 12:
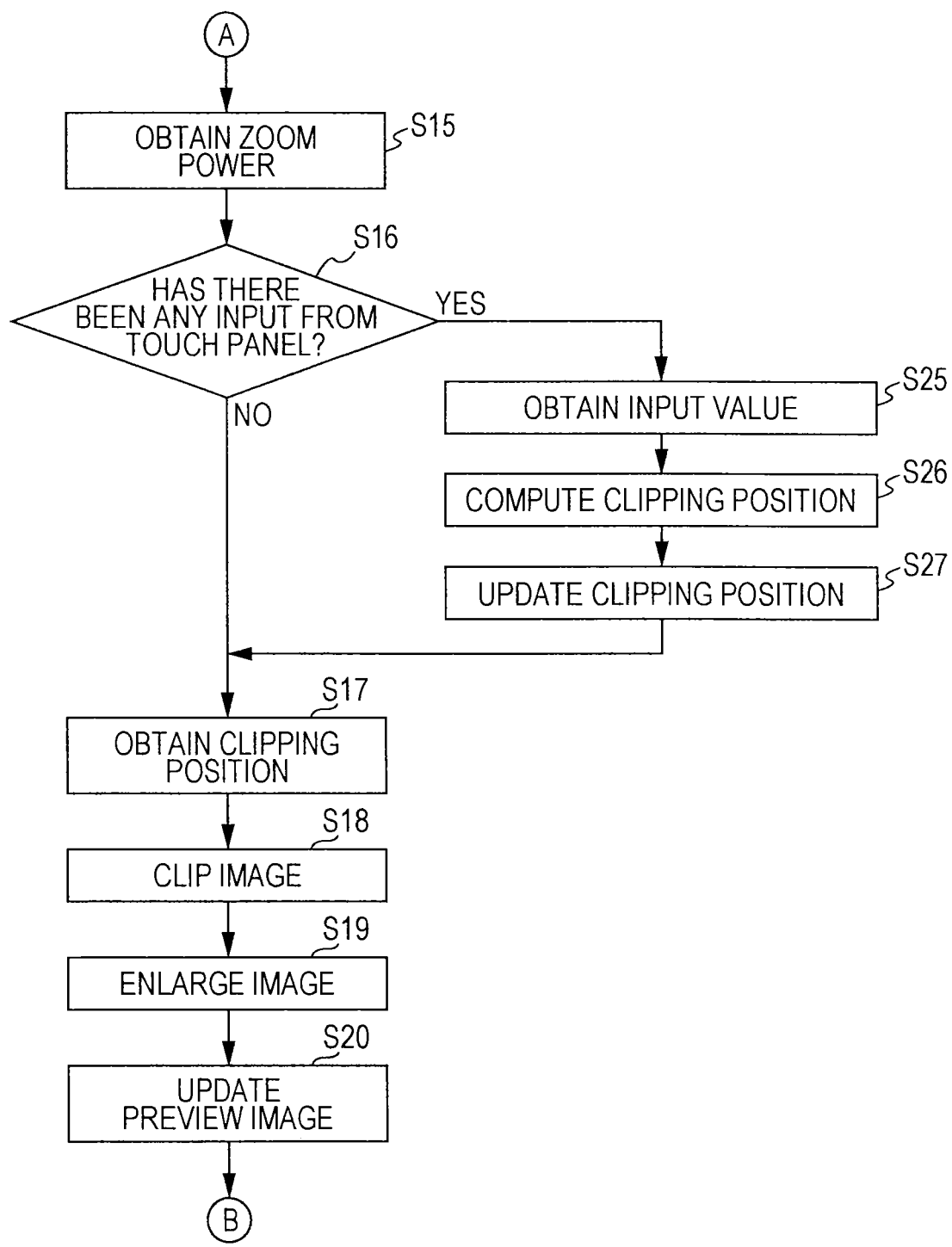
FIG. 12 is a flowchart of a processing portion of a zoom mode being determined and thereafter of processing from camera unit activation to enlarged image saving at the time of a still image being shot with the personal digital assistant according to the present embodiment.

FIG. 11 and FIG. 12 illustrate the flowchart of processing from camera unit activation, generation of an enlarged image according to the digital zoom, up to saving of the enlarged image thereof at the time of a still image being shot at the personal digital assistant according to the present embodiment. In the event of the present embodiment, the processing of the flowchart in FIG. 11 and FIG. 12 is realized by the control/computing unit 12 executing the image photography control program according to the present embodiment to control the camera control/photographed signal processing unit 22, video signal processing unit 20, and touch panel control unit 24.

First, with the flowchart in FIG. 11, upon camera activation instructions for shooting of a still image being input from the photographer through operations as to the key operating unit 32 or touch panel 25 for example, the control/computing unit 12 starts the processing of this flowchart, and activates the camera unit 23 through the camera control/photographed signal processing unit 22 as processing in step S1.

Also, upon the camera unit 23 being activated, the control/computing unit 12 controls the video signal processing unit 20 to perform initialization of the clipping position (e.g., the center coordinates of the input image 40 or the like) as processing in step S2.

Next, the control/computing unit 12 starts imaging of a still image by the camera unit 23 through the camera control/photographed signal processing unit 22, and transmits the photographed image by the camera unit 23 to the video signal processing unit 20 as the input image 40, as processing in step S3. The video signal processing unit 20 which has received this input image 40 generates a preview image 50 from this input image 40, and displays the preview image 50 thereof on the screen of the display panel 21.

Also, the control/computing unit 12 determines whether or not instructions for proceeding to the zoom mode have been input from the photographer through operations as to the touch panel 25 or key operating unit 32, or whether or not transition to the zoom mode has already been performed, as processing in step S4. In the event that determination is made in step S4 that the current mode is not the zoom mode, the control/computing unit 12 advances the processing to step S5, and on the other hand, in the event that determination is made in step S4 that the current mode is the zoom mode, advances the processing to step S15 in FIG. 12.

In the event of the processing being proceeded to step S15 in FIG. 12, the control/computing unit 12 obtains the zoom power at this point, and advances the processing to step S16. Note that the photographer can specify the zoom power, for example, through operations as to the touch panel 25 or key operating unit 32.

Upon proceeding to the processing in step S16, the control/computing unit 12 monitors whether or not input has been obtained from the touch panel 25 through the touch panel control unit 24, and advances the processing to step S17 in the event that input from the touch panel 25 has not been obtained, and on the other hand, advances the processing to step S25 in the event that input from the touch panel 25 has been obtained.

Upon proceeding to the processing in step S25, the control/computing unit 12 obtains the input value of the touch panel 25 obtained from the touch panel control unit 24, and thereafter obtains the clipping position at the time of clipping the image from the input value of the touch panel 25 as processing in step S26. The control/computing unit 12 then updates, according to the clipping position obtained in step S26, the clipping position obtained so far as processing in step S27. That is to say, in the event that the clipping position obtained so far is the initial value, the control/computing unit 12 updates the initial value to the clipping position obtained in step S26, and in the event that the clipping position obtained so far is other than the initial value, updates the clipping position thereof to the clipping position obtained in step S26. Upon the updating processing in step S27 being completed, the control/computing unit 12 advances the processing to step S17.

Upon proceeding to processing in step S17, the control/computing unit 12 transmits the clipping position to the video signal processing unit 20.

Next, the control/computing unit 12 controls the video signal processing unit 20 to perform clipping of an image from the input image 40 with the clipping position as the center coordinates, and with the size according to the zoom power, as processing in step S18.

Further, the control/computing unit 12 controls the video signal processing unit 20 to enlarge the clipped image 42 according to the screen size of the display panel 21 as processing in step S19, and to update the enlarged image thereof as the preview image 50 as processing in step S20.

After this processing in step S20, the control/computing unit 12 advances the processing to step S5 in FIG. 11.

Upon proceeding to the processing in step S5, the control/computing unit 12 controls the video signal processing unit 20 to display the preview image 50 on the display panel 21.

Next, the control/computing unit 12 monitors whether or not the shutter key of the key operating unit 32 has been pressed by the photographer, as processing in step S6. In the event that the shutter key has not been pressed, the control/computing unit 12 returns the processing to step S3, and in the event that determination is made that the shutter key has been pressed, advances the processing to step S7.

Upon proceeding to the processing in step S7, the control/computing unit 12 obtains the image photographed at the camera unit 23 at the time of the shutter key being pressed, from the camera control/imaged signal processing unit 24.

The control/computing unit 12 then obtains the clipping position updated in the previous step S27 as processing in step S8, and also clips an image from the photographed image at the clipping position as processing in step S9, and further enlarges the clipped image thereof as processing in step S10, and then saves the data of this enlarged image, for example, in a predetermined storage place such as the memory unit 13 or the like as processing in step S11. Note that clipping and enlargement of the image may also be performed by the video signal processing unit 20.

Thereafter, in the event that instructions for ending imaging using the camera have been performed by the photographer, for example, through operations as to the key operating unit 32 or touch panel 25, the control/computing unit 12 ends the processing of the flowchart in FIG. 11 and FIG. 12. Note that, in the event that instructions for ending imaging using the camera have not been performed, the control/computing unit 12 may return the processing to step S2.

[Flow from Camera Activation to Generation of Zoom Enlarged Image and Saving of Image at Time of Shooting Moving Image]

The personal digital assistant according to the present embodiment is configured so as to generate a zoom enlarged image at the time of shooting of a moving image in the same way as the zoom enlarged image generation processing at the time of shooting of a still image as described above.

Figure 13:
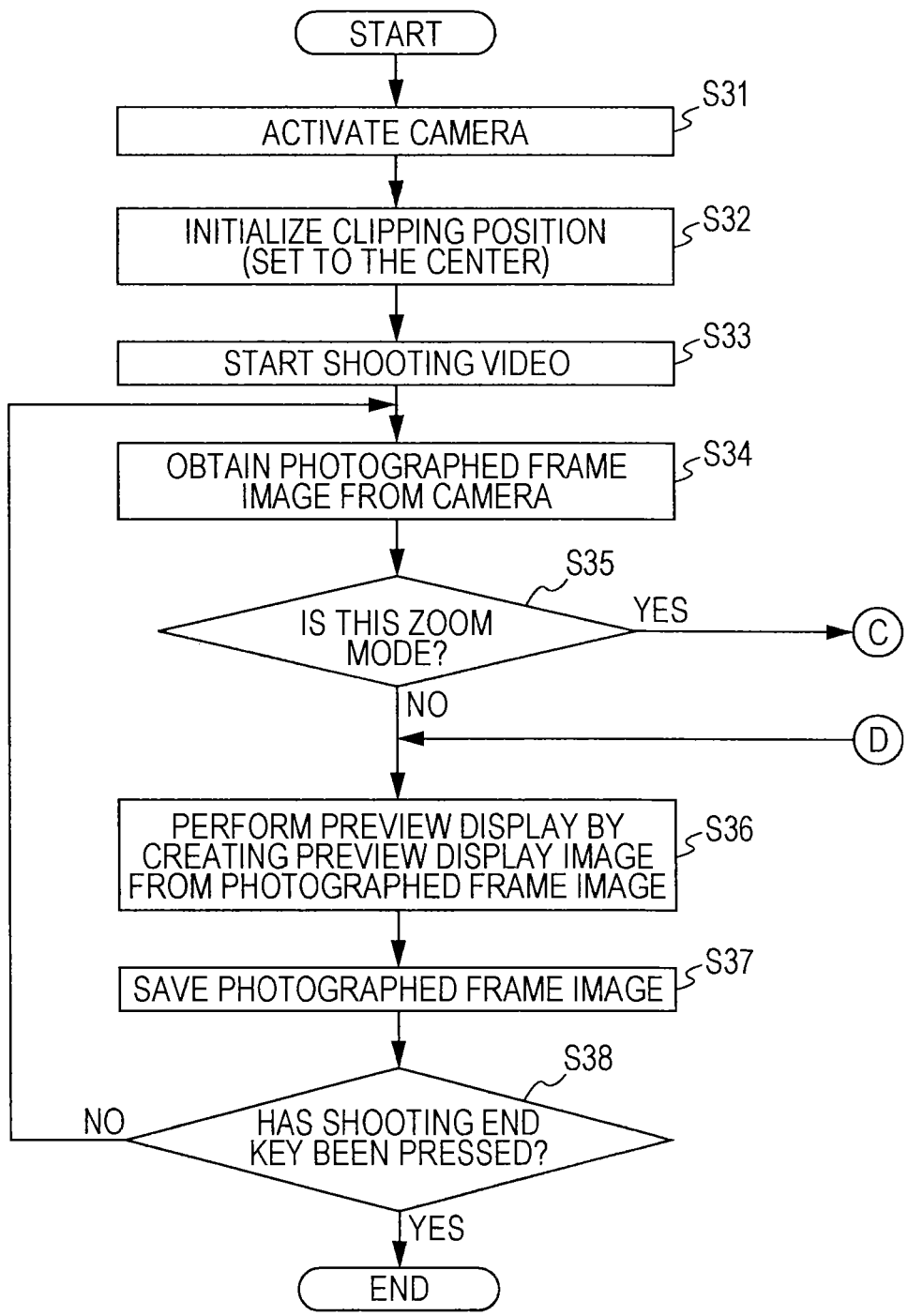
FIG. 13 is a flowchart of a processing portion of camera activation, zoom mode determination, and shot frame saving, and so forth of processing from camera unit activation to enlarged image saving at the time of a moving image being shot with the personal digital assistant according to the present embodiment.
Figure 14:
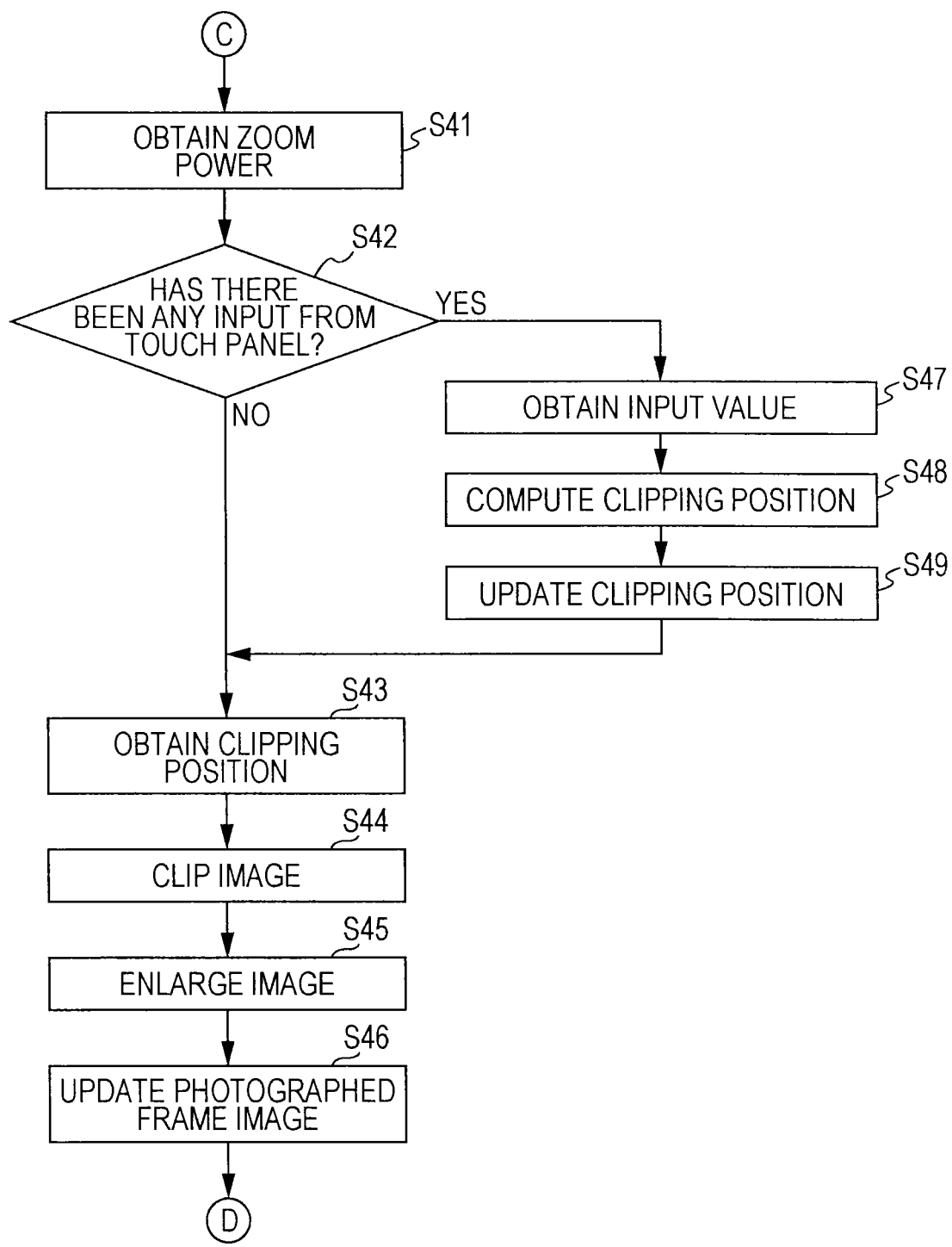
FIG. 14 is a flowchart of a processing portion of the zoom mode being determined and thereafter of processing from camera unit activation to enlarged image saving at the time of a moving image being shot with the personal digital assistant according to the present embodiment.

FIG. 13 and FIG. 14 illustrate the flowchart of processing from camera unit activation, generation of an enlarged image according to the digital zoom, up to saving of the enlarged image thereof at the time of a moving image being shot at the personal digital assistant according to the present embodiment. In the event of the present embodiment, the processing of the flowchart in FIG. 13 and FIG. 14 is realized by the control/computing unit 12 executing the image photography control program according to the present embodiment to control the camera control/photographed signal processing unit 22, video signal processing unit 20, and touch panel control unit 24.

First, with the flowchart in FIG. 13, upon camera activation instructions for shooting of a moving image being input from the photographer through operations as to the key operating unit 32 or touch panel 25 for example, the control/computing unit 12 starts the processing of this flowchart, and activates the camera unit 23 through the camera control/photographed signal processing unit 22 as processing in step S31.

Also, upon the camera unit 23 being activated, the control/computing unit 12 controls the video signal processing unit 20 to perform initialization of the clipping position (e.g., the center coordinates of the input image 40 or the like) as processing in step S32.

Next, upon moving image shooting start instructions being input from the photographer, for example, through operations as to the key operating unit 32 or touch panel 25, the control/computing unit 12 advances the processing to step S34 as processing in step S33.

Upon proceeding to processing in step S34, the control/computing unit 12 starts shooting a moving image by the camera unit 23 through the camera control/photographed signal processing unit 22, and transmits the moving image frame image by the camera unit 23 to the video signal processing unit 20 as the input image 40. The video signal processing unit 20 which has received the input image 40 of this moving image frame generates a moving image preview image 50 from the input image 40 of this moving image frame, and displays the preview image 50 of this moving image on the screen of the display panel 21.

Also, the control/computing unit 12 determines whether or not instructions for proceeding to the zoom mode have been input from the photographer, for example, through operations as to the touch panel 25 or key operating unit 32, or whether or not transition to the zoom mode has already been performed, as processing in step S35. In the event that determination is made in step S35 that the current mode is not the zoom mode, the control/computing unit 12 advances the processing to step S36, and on the other hand, in the event that determination is made that the current mode is the zoom mode, advances the processing to step S41 in FIG. 14.

In the event of the processing being proceeded to step S41 in FIG. 14, the control/computing unit 12 obtains the zoom power at this point, and advances the processing to step S42. Note that the photographer can specify the zoom power, for example, through operations as to the touch panel 25 or key operating unit 32.

Upon proceeding to the processing in step S42, the control/computing unit 12 monitors whether or not input has been obtained from the touch panel 25 through the touch panel control unit 24, and advances the processing to step S43 in the event that input from the touch panel 25 has not been obtained, and on the other hand, advances the processing to step S47 in the event that input from the touch panel 25 has been obtained.

Upon proceeding to the processing in step S47, the control/computing unit 12 obtains the input value of the touch panel 25 obtained from the touch panel control unit 24, and thereafter obtains the clipping position at the time of clipping the image from the input value of the touch panel 25 as processing in step S48. The control/computing unit 12 then updates, according to the clipping position obtained in step S48, the clipping position obtained so far as processing in step S49. That is to say, in the event that the clipping position obtained so far is the initial value, the control/computing unit 12 updates the initial value to the clipping position obtained in step S48, and in the event that the clipping position obtained so far is other than the initial value, updates the clipping position thereof to the clipping position obtained in step S48. Upon the updating processing in step S49 being completed, the control/computing unit 12 advances the processing to step S43.

Upon proceeding to processing in step S43, the control/computing unit 12 transmits the clipping position to the video signal processing unit 20.

Next, the control/computing unit 12 controls the video signal processing unit 20 to perform clipping of an image from the input image 40 of the moving image frame with the clipping position as the center coordinates, and with the size according to the zoom power, as processing in step S44.

Further, the control/computing unit 12 controls the video signal processing unit 20 to enlarge the image 42 clipped out from the input image 40 of the moving image frame according to the screen size of the display panel 21 as processing in step S45, and to update the enlarged image thereof as the preview image 50 of the moving image frame as processing in step S46.

After this processing in step S46, the control/computing unit 12 advances the processing to step S36 in FIG. 13.

Upon proceeding to the processing in step S36, the control/computing unit 12 controls the video signal processing unit 20 to display the preview image 50 according to the moving image frame of the enlarged image on the display panel 21.

Next, the control/computing unit 12 saves the moving image data made up of the moving image frame of the enlarged image in a predetermined storage place, for example, such as the memory unit 13 or the like as processing in step S37. Note that image clipping and enlargement of the moving image frame may be performed by the video signal processing unit 20.

Thereafter, the control/computing unit 12 monitors whether or not instructions for ending shooting of moving images have been performed from the photographer, for example, through operations as to the key operating unit 32 or touch panel 25 as processing in step S38, and in the event that instructions for ending shooting of moving images have not been performed, returns the processing to step S34, and on the other hand, in the event that instructions for ending shooting of moving images have been performed, ends the processing of the flowchart in FIG. 13 and FIG. 14.

As described above, the personal digital assistant according to the present embodiment is also configured so as to generate a zoom enlarged image at the time of shooting a moving image, and also configured so as to move the clipping position when clipping an image from the input image 40 according to the direction and distance that the photographer specified on the touch panel 25, in a state with the preview image 50 of the moving image being displayed on the display panel 21, to enlarge the clipped image according to movement thereof, and to display as a preview image. Thus, according to the present embodiment, the photographer can perform photography placing a desired subject image in an intended position easily and in a sure manner at the time of digital zoom of a moving image by performing intuitive operations such as instructions for direction and distance on the display panel 21 where the preview image 50 of a moving image is displayed, without performing work, for example, such as movement or directional change of the camera. Also, according to the present embodiment, even in the event that display of the enlarged preview image 50 of the moving image is performed, in the same way as described above, the direction and distance of the image clipping position may be specified by operations, for example, such as a direction specifying key or the like provided to the key operating unit 32. Also, though a specific display example will be omitted, even at the time of enlargement display of this moving image, display may be made on the display panel 21 indicating the entire input image before enlargement, and the image clipping position, along with the preview image 50 of the moving image.

[Overview of Generation and Display of Enlarged Image at Time of Digital Zoom, and Tacking Processing]

The personal digital assistant according to the present embodiment can cause the position for clipping the image to follow movement of a tracking reference image to be tracked using the object tracking technique at the time of the image clipping for generating an enlarged image from the input image 40 in the same way as described above.

Note that the tracing processing of the image clipping position in accordance with movement of this tracking reference image can be performed in any case of preview image display made up of the moving image before the shutter key is pressed at the time of shooting of a still image, or preview image display at the time of shooting a moving image as described above.

The tracing processing of the image clipping position in accordance with movement of the tracking reference image will be described with reference to FIG. 15 through FIG. 19.

Figure 15:
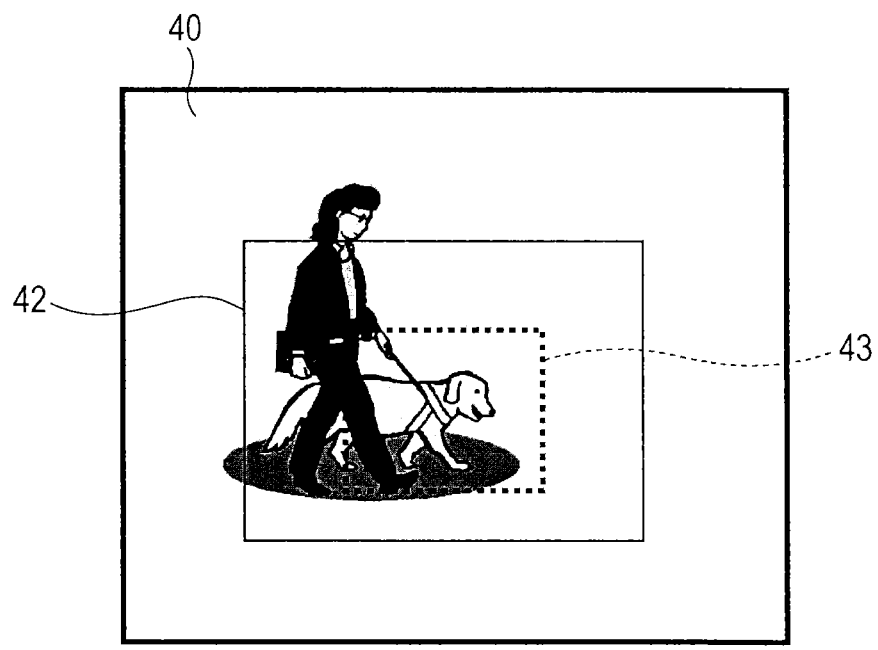
FIG. 15 is a diagram illustrating an example of an input image imaged by the camera unit, a clipped image clipped from an input image thereof using digital zoom, and a tracking reference image to be traced by object tracking with the personal digital assistant according to the present embodiment.
Figure 19:
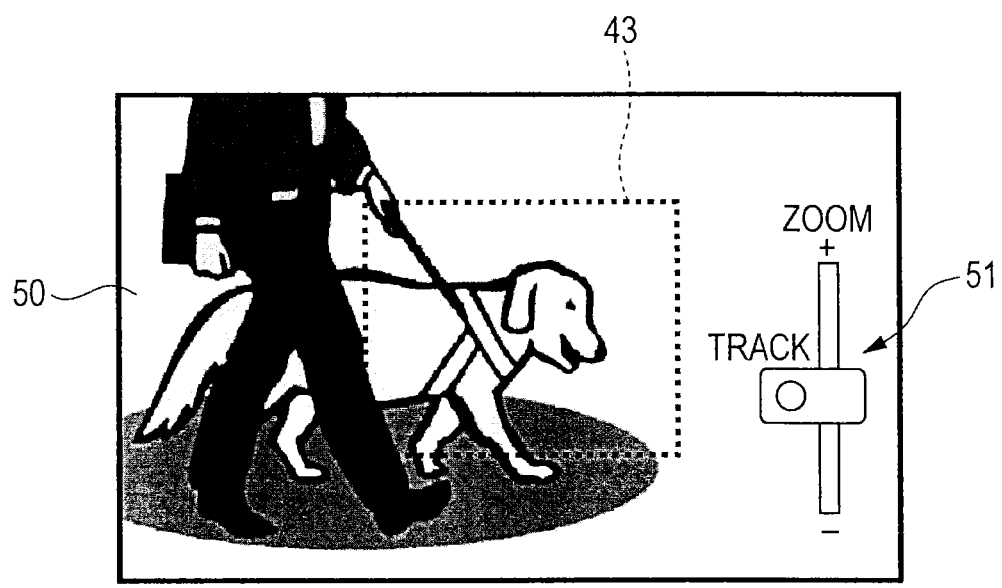
FIG. 19 is a diagram illustrating an example of a preview image where a clipped image clipped from an input image is enlarged and displayed in accordance with movement of a tracking reference image, with the present embodiment.

FIG. 15 illustrates an example of the input image 40 imaged by the imaging sensor of the camera unit 23, the clipped image 42 to be clipped by the digital zoom from the input image 40, and the tracking reference image 43 to be tracked by the object tracking. Also, FIG. 16, FIG. 17, and FIG. 19 illustrate an example of the preview image 50 where the clipped image 42 is enlarged and displayed.

Figure 16:
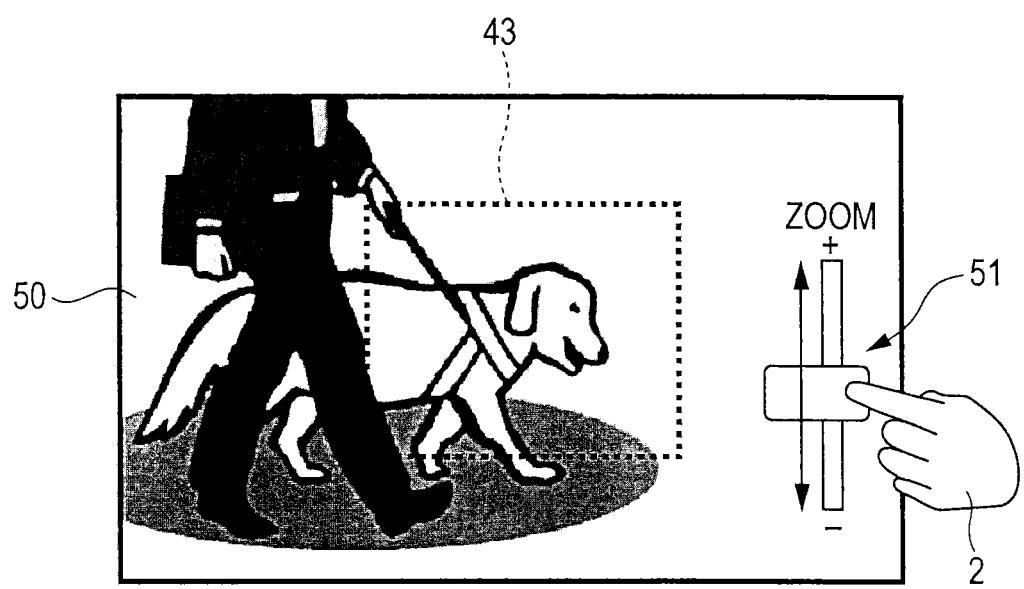
FIG. 16 is a diagram illustrating an example of a preview image where a clipped image is enlarged and displayed, and illustrating an example wherein a zoom power specification icon at the time of the photographer specifying a zoom power is displayed, with the present embodiment.

Here, upon the digital zoom being activated, the personal digital assistant according to the present embodiment displays a zoom power specifying icon 51 made up of a slide bar and a lever within the preview image 50 as shown in FIG. 16. Moreover, upon instruction input for moving the lever of the zoom power specifying icon 51 in the slider direction being performed by the photographer, for example, through operations as to the touch panel 25 by a finger of the hand 2 or the like, the personal digital assistant according to the present embodiment sets zoom power according to the movement position of the lever on the slider. Upon setting of the zoom power according to the movement position of the lever being performed, the personal digital assistant according to the present embodiment clips an image according to the set zoom power from the input image 40, and enlarges this, and displays on the display panel 21 as the preview image 50.

Figure 17:
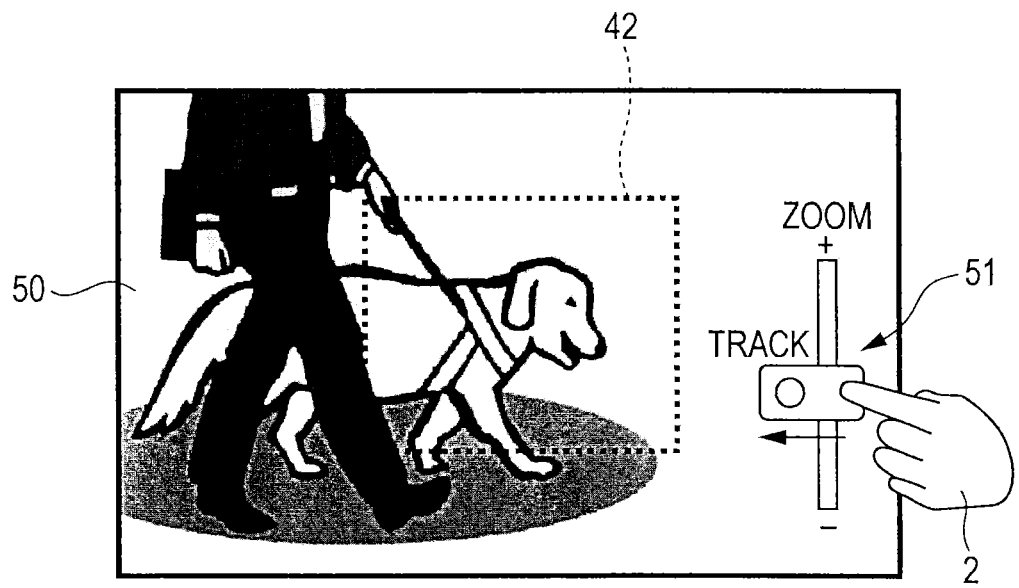
FIG. 17 is a diagram illustrating an example of a preview image where a clipped image is enlarged and displayed, and illustrating a scene where the photographer is operating the zoom power specification icon for specifying start of object tracking, with the present embodiment.

Also, with the present embodiment, the lever of the zoom power specifying icon 51 is configured so as to be used for instruction input for starting or stopping the operation of the object tracking as shown in FIG. 17 in addition to use for setting the zoom power. Specifically, as an example, in the event that input specification in the direction orthogonal to the slider direction has been performed as to the lever of the zoom power specifying icon 51 by the photographer, the personal digital assistant according to the present embodiment automatically selects, for example, an image region with a predetermined size in the center within the preview image 50, and sets the selected image region thereof to the tracking reference image 43.

Figure 18:
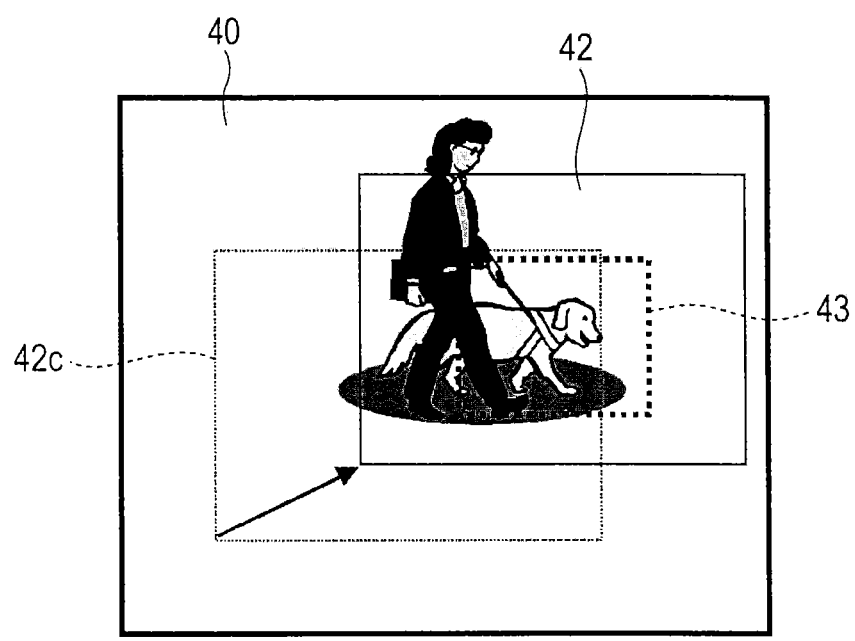
FIG. 18 is a diagram illustrating a scene where the position of an image clipped from an input image is caused to follow movement of a tracking reference image, with the present embodiment.

Further, as shown in FIG. 18, the personal digital assistant according to the present embodiment determines, regarding the input image 40 for each frame being shot by the imaging sensor of the camera unit 23, each position of the tracking reference images 43 within the input image 40, and tracks these determined positions between the frames.

As shown in FIG. 18, the personal digital assistant according to the present embodiment causes the position of an image clipped from the input image 40 to follow, for example, as with the position of the clipped image 42 of the current frame from the position of a clipped image 42c of the past frame, movement of the tracking reference image 43. Note that, at the time of clipping an image from the input image 40, the personal digital assistant according to the present embodiment performs clipping so that the tracking reference image 43 is positioned, for example, in the center of this clipped image 42. The personal digital assistant then enlarges the clipped image 42, and displays on the display panel 21 as the preview image 50.

Thus, as shown in FIG. 19, the preview image 50 becomes a displayed image enlarged from the clipped image 42 clipped from the input image 40 in accordance with movement of the tracking reference image 43. It goes without saying that upon the zoom power being changed by the lever of the zoom power specifying icon 51 being further operated in the slide bar direction, the personal digital assistant according to the present embodiment also changes the scale of the preview image 50 to be displayed on the display panel 21.

As described above, the personal digital assistant according to the present embodiment is configured so as to cause the clipped image 42 to follow movement of the tracking reference image 43. Thus, according to the present embodiment, the photographer can perform shooting of a moving image wherein a desired subject image is placed in an intended position easily and in a sure manner at the time of the digital zoom without performing work such as, for example, movement or directional change of the camera.

[Overview from Camera Activation, Setting of Tracking Reference Image, Tracking of Zoom Enlarged Image According to Movement of Tracking Reference Image Thereof, and Up to Image Saving]

Description will be made regarding overview from camera activation, selection of the tracking reference image, tracking of a zoom enlarged image according to movement of the tracking reference image thereof, and up to image saving, with the personal digital assistant according to the present embodiment, with reference to FIG. 20.

Figure 20:
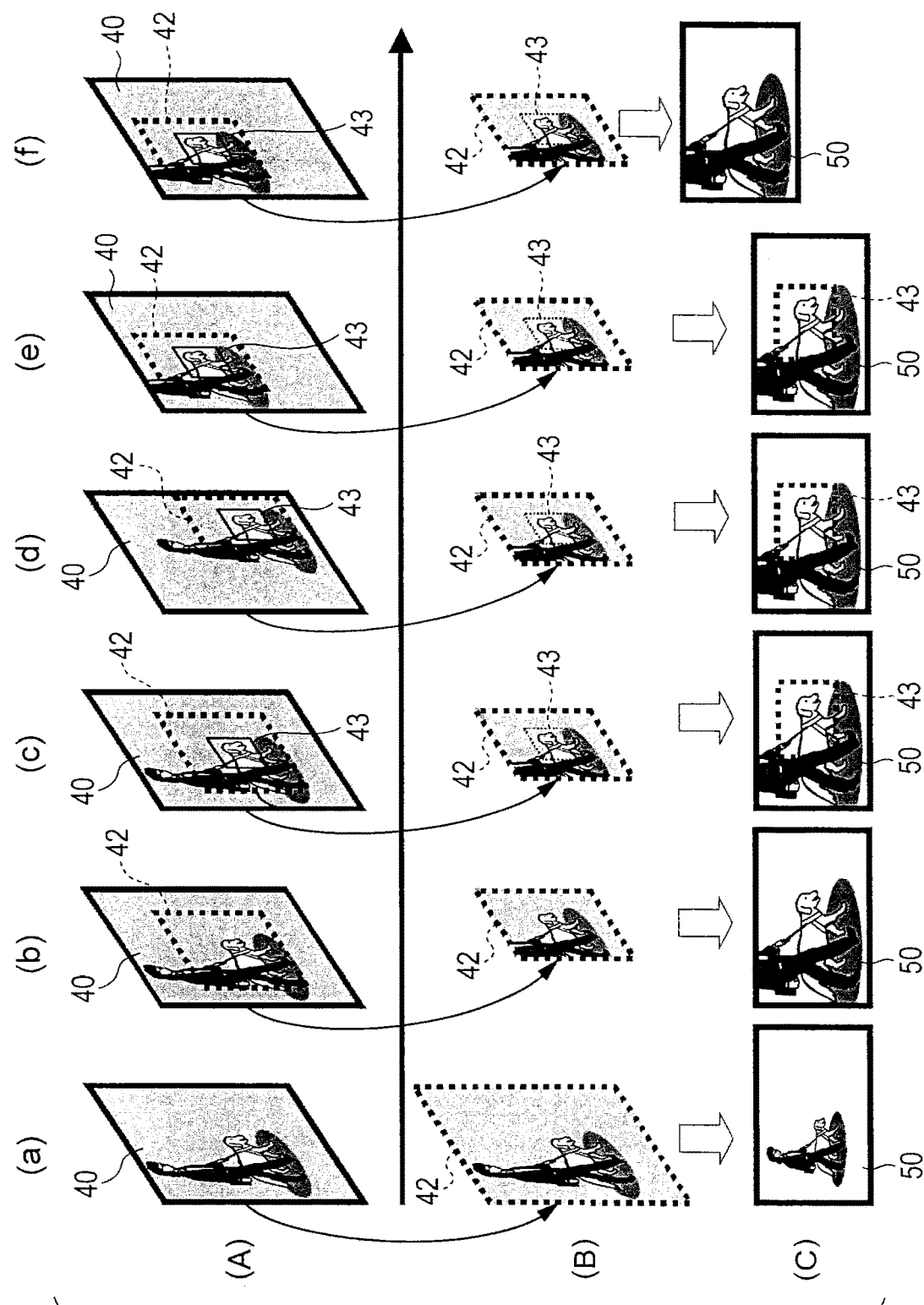
FIG. 20 is a diagram used for brief description from activation of the camera unit, selection of a tracking reference image, tracing of a zoom enlarged image according to movement of a tracking reference image thereof, and up to saving of a moving image, with the personal digital assistant according to the present embodiment.

Note that the example in FIG. 20 illustrates that at the time of shooting of a still image, movement of the tracking reference image, and tracking of a zoom enlarged image according thereto are performed regarding a moving image before the shutter key is pressed, and thereafter, until the still image is saved by the shutter key being pressed.

In FIG. 20, column (a) in row (A) to column (f) in row (A) in the drawing illustrate the input image 40 of each frame photographed by the imaging sensor of the camera unit 23 and supplied from the camera control/imaged signal processing unit 22 to the video signal processing unit 20. Note that these input images 40 are not images for each frame cycle but the frame input images extracted at point of time when an operation or processing necessary for description is performed.

Also, column (a) in row (B) to column (f) in row (B) in FIG. 20 illustrate the clipped images 42 clipped from the input images 40 from column (a) in row (A) to column (0 in row (A) in FIG. 20, respectively. Also, column (a) in row (C) to column (f) in row (C) in FIG. 20 illustrate the preview images 50 enlarged from the clipped images 42 from column (a) in row (B) to column (0 in row (B) in FIG. 20 and displayed on the display panel 21.

Also, column (a) in FIG. 20 illustrates the input image 40, clipped image 42, and preview image 50 at the time of the power of the digital zoom being 1×, i.e., no enlargement being performed after camera activation. That is to say, in the event that the digital zoom has not been started after camera activation, the preview image 50 is taken as an image having the same size as the input image 40.

Column (b) in FIG. 20 illustrates the input image 40 immediately after the digital zoom is started after activation of the camera unit 23, the clipped image 42 clipped from the input image 40 according to enlargement power set as the initial value at the time of start of this digital zoom, and the preview image 50 enlarged therefrom. Specifically, at the time of start of the digital zoom, the personal digital assistant according to the present embodiment takes, in the same way as the above example in FIG. 5, the center coordinates (x, y)=(0, 0) of the input image 40 as the center coordinates of the clipped image 42, and also performs clipping of the image with the size according to the zoom power set as the initial value beforehand, and displays the clipped image 42 thereof on the display panel 21 as the preview image 50.

Column (c) in FIG. 20 illustrates the clipped image 42 to be clipped from the input image 40 according to the zoom power at the point of time when the setting of the tracking reference image 43 is performed and this tracking reference image 43 is placed in the center, the clipped image 42 after clipping thereof, and the preview image 50 enlarged therefrom.

Column (d) in FIG. 20 illustrates the clipped image 42 to be clipped from the input image 40 at the position according to movement of the tracking reference image 43 when the setting of the tracking reference image 43 is performed as with column (c) in FIG. 20 and then this tracking reference image 43 is moved, the clipped image 42 after clipping thereof, and the preview image 50 enlarged therefrom.

Also, column (e) in FIG. 20 illustrates the clipped image 42 to be clipped from the input image 40 at the position according to movement of the tracking reference image 43 when the tracking reference image 43 is further moved to another position after the tracking reference image 43 is moved as with column (d) in FIG. 20, the clipped image 42 after clipping thereof, and the preview image 50 enlarged therefrom.

Column (f) in FIG. 20 is the same as column (e) in FIG. 20, and illustrates the input image 40, clipped image 42, and preview image 50 immediately before saving of the images in column (f) in FIG. 20 is performed. Also, column (0 in FIG. 20 illustrates the input image 40 when shooting execution instructions are input by the shutter key of the key operating unit 32 being pressed by the photographer, the clipped image 42 clipped from the input image 40 thereof, and the preview image 50 enlarged from this clipped image 42. In the case of this column (f) in FIG. 20, the preview image 50 becomes a recorded image, and saved, for example, in the memory unit 13 or the like under the control of the control/computing unit 12.

[Flow of Generation and Display of Enlarged Image at Time of Digital Zoom and Tracking Processing at Time of Shooting of Still Image]

Figure 21:
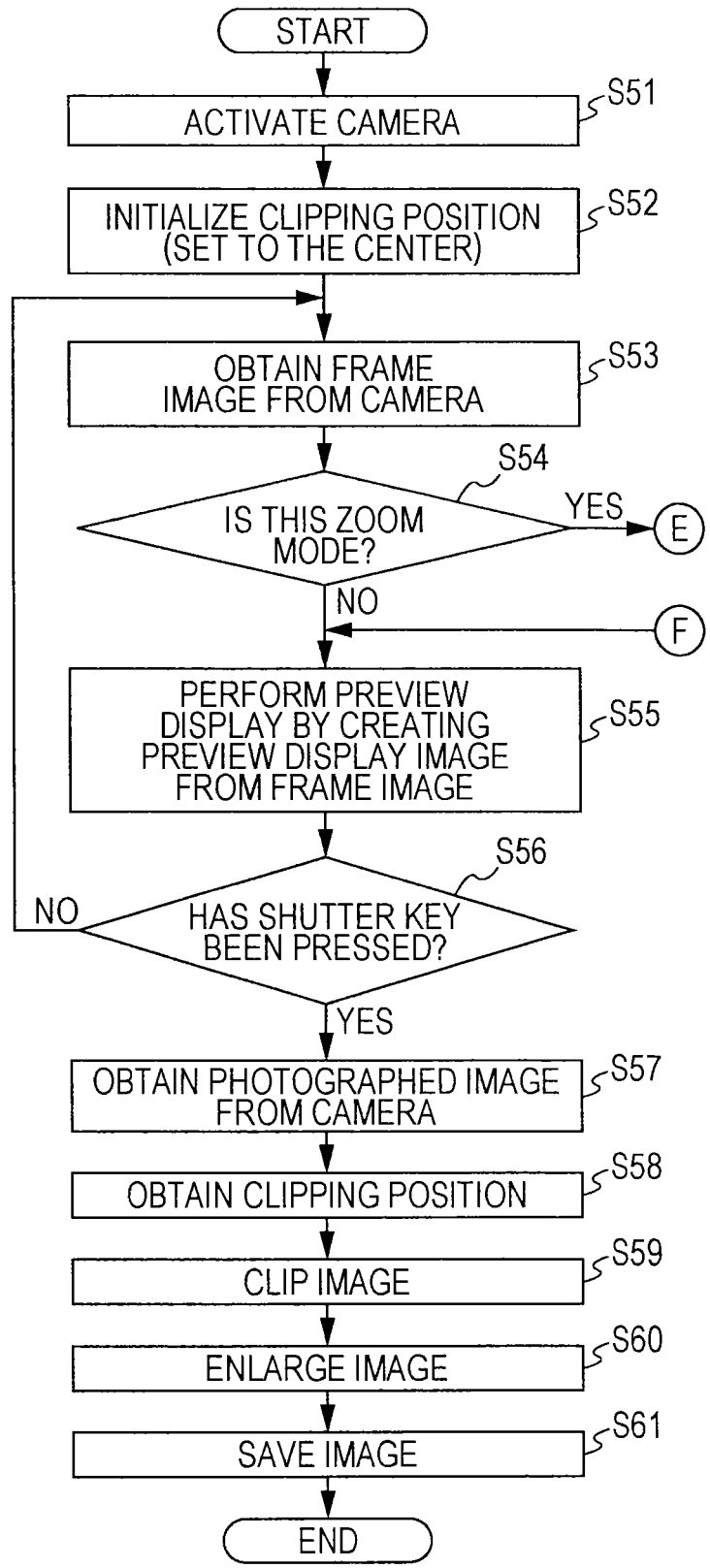
FIG. 21 is a flowchart illustrating a processing portion of camera activation, zoom mode determination, photographed frame saving, and so forth of processing causing the clipping image position to follow movement of a tracking reference image at the time of shooting of a still image, with the personal digital assistant according to the present embodiment.
Figure 22:
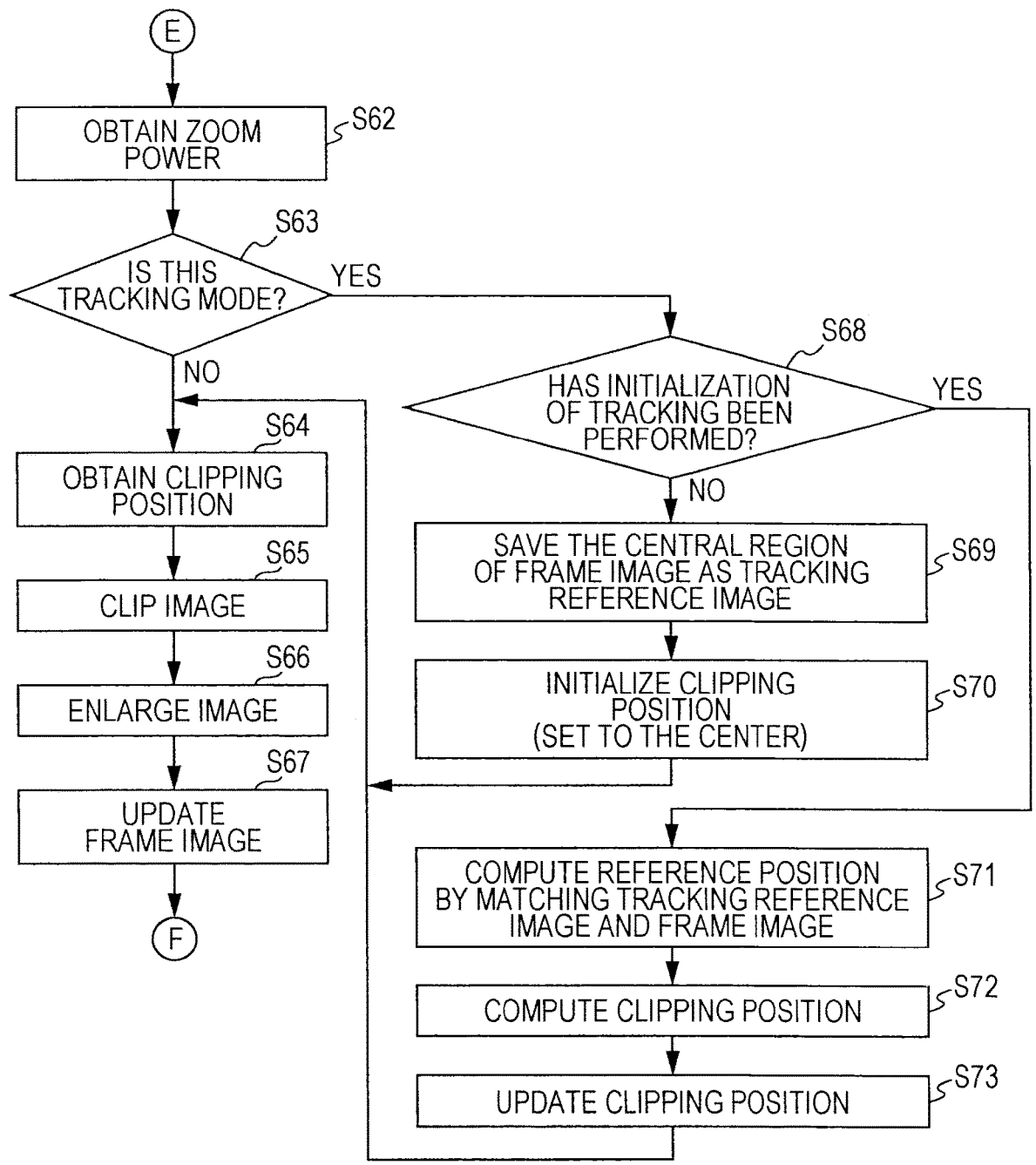
FIG. 22 is a flowchart of a processing portion of the zoom mode being determined and thereafter of processing causing the clipping image position to follow movement of a tracking reference image in the personal digital assistant according to the present embodiment.

FIG. 21 and FIG. 22 illustrate the flowchart of processing from camera unit activation up to image saving at the time of executing processing causing the clipping image position to follow movement of the tracking reference image as described above, with the personal digital assistant according to the present embodiment.

Note that, in these FIG. 21 and FIG. 22, processing causing the clipping image position to follow movement of the tracking reference image is performed at the time of preview image display made up of a moving image in the case of shooting of a still imaging being performed.

With the present embodiment, the processing of the flowchart in FIG. 21 and FIG. 22 is realized by the control/computing 12 executing the image photography control program according to the present embodiment to control the camera control/photographed signal processing unit 22, video signal processing unit 20, and touch panel control unit 24.

First, with the flowchart in FIG. 21, upon camera activation instructions being input from the photographer, for example, through operations as to the key operating unit 32 or touch panel 25, the control/computing unit 12 starts the processing of this flowchart, and activates the camera unit 23 through the camera control/imaged signal processing unit 22 as processing in step S51.

Also, upon the camera unit 23 being activated, the control/computing unit 12 controls the video signal processing unit 20 to perform initialization of the clipping position (e.g., initialization such that the input image 40 is taken as the center coordinates) as processing in step S52.

Next, the control/computing unit 12 starts, as processing in step S53, through the camera control/photographed signal processing unit 22, imaging of a frame image using the camera unit 23 for preview image display, and transmits the frame image from the camera unit 23 to the video signal processing unit 20 as the input image 40. The video signal processing unit 20 which has received the input image 40 of this frame generates a preview image 50 from this input image 40, and displays this preview image 50 on the display panel 21.

Also, the control/computing unit 12 determines, as processing in step S54, whether or not transition instructions to the zoom mode have been input from the photographer, or whether or not transition to the zoom mode has already been performed, for example, through operations as to the touch panel 25 or key operating unit 32. In the event that determination is made in this step S54 that the current mode is not the zoom mode, the control/computing unit 12 advances the processing to step S55, and on the other hand, in the event that determination is made that the current mode is the zoom mode, advances the processing to step S62 in FIG. 22.

In the event of the processing being proceeded to step S62 in FIG. 22, the control/computing unit 12 obtains the set zoom power at this point, and advances the processing to step S63. Note that the photographer can specify the zoom power, for example, through operations as to the touch panel 25 or key operating unit 32.

Upon proceeding to the processing in step S63, the control/computing unit 12 monitors, through the touch panel control unit 24, whether or not instruction input for starting the operation of the object tracking has been obtained from the touch panel 25, and in the event that the operation start instruction input for the object tracking has not been obtained from the touch panel 25, advances the processing to step S64, and on the other hand, in the event that the operation start instruction input for the object tracking has not been obtained from the touch panel 25, advances the processing to step S68.

Upon proceeding to the processing in step S68, the control/computing unit 12 determines whether or not initialization for the object tracking has been performed, and advances the processing to step S69 in the event that initialization has not been performed, and on the other hand, advances the processing to step S71 in the event that initialization has been performed.

In the event of proceeding to the processing in step S69, the control/computing unit 12 sets and stores, for example, an image region made up of a predetermined size in the center within the input image 40 that is a photographed frame as the tracking reference image 43.

Next, the control/computing unit 12 advances the processing to step S70, and initializes the position for clipping an image from the input image 4C based on the set tracking reference image 43. That is to say, the position for clipping the image at this time is set (initialized) to the center position of the input image 40 according to the tracking reference image 43 set to the center. After this processing in step S70, the control/computing unit 12 advances the processing to step S64.

Upon proceeding to the processing in step S64, the control/computing unit 12 transmits the set clipping position to the video signal processing unit 20.

Next, the control/computing unit 12 controls, as processing in step S65, the video signal processing unit 20 to take the clipping position as the center coordinates, and to perform clipping of an image from the input image 40 with a size according to the zoom power.

Further, the control/computing unit 12 controls, as processing in step S66, the video signal processing unit 20 to enlarge an image 42 clipped from the input image 40 according to the screen size of the display panel 21, and to update, as processing in step S67, the enlarged image thereof as a preview image 50.

After this processing in step S67, the control/computing unit 12 advances the processing to step S55 in FIG. 21.

On the other hand, in the event of proceeding to the processing in step S71 from step S68 in FIG. 22, the control/computing unit 12 matches the tracking reference image 43 and the input image 40 for each frame, and obtains the position of the tracking reference image 43 for each frame.

Next, the control/computing unit 12 computes the position for clipping an image from the input image 40 for each frame based on the position of the tracking reference image 43 as processing in step S72.

Next, the control/computing unit 12 updates the clipping position obtained so far using the clipping position obtained in step S72 as processing in step S73. That is to say, thus, upon the tracking reference image 43 moving between the frames, the image clipping position between the frames will be updated following movement of this tracking reference image 43. After this updating processing in step S73, the control/computing unit 12 advances the processing to step S64. In this case, with the processing in step S64 and thereafter, processing such as the image clipping or the like will be performed using this updated image clipping position.

Also, upon proceeding to step S55 in FIG. 21 from step S67 in FIG. 22, the control/computing unit 12 displays the preview image 50 made up of the enlarged image on the display panel 21.

Next, the control/computing unit 12 monitors whether or not the shutter key of the key operating unit 32 has been pressed by the photographer, as processing in step S56. In the event that the shutter key has not been pressed, the control/computing unit 12 returns the processing to step S53, and in the event that determination is made that the shutter key has been pressed, advances the processing to step S57.

Upon proceeding to the processing in step S57, the control/computing unit 12 obtains the image photographed at the camera unit 23 at the time of the shutter key being pressed, from the camera control/imaged signal processing unit 24. The control/computing unit 12 then obtains the clipping position updated in the previous step S73 as processing in step S58, and also clips an image from the photographed image at the clipping position as processing in step S59, and further enlarges the clipped image thereof as processing in step S60, and then saves the data of this enlarged image, for example, in a predetermined storage place such as the memory unit 13 or the like as processing in step S61. Note that clipping and enlargement of the image may also be performed by the video signal processing unit 20.

Thereafter, in the event that instructions for ending imaging using the camera have been performed by the photographer, for example, through operations as to the key operating unit 32 or touch panel 25, the control/computing unit 12 ends the processing of the flowchart in FIG. 21 and FIG. 22. Note that, in the event that instructions for ending imaging using the camera have not been performed by the photographer, the control/computing unit 12 may return the processing to step S52.

[Flow of Generation and Display of Enlarged Image at Time of Digital Zoom at Time of Shooting Moving Image and Tracking Processing]

Figure 23:
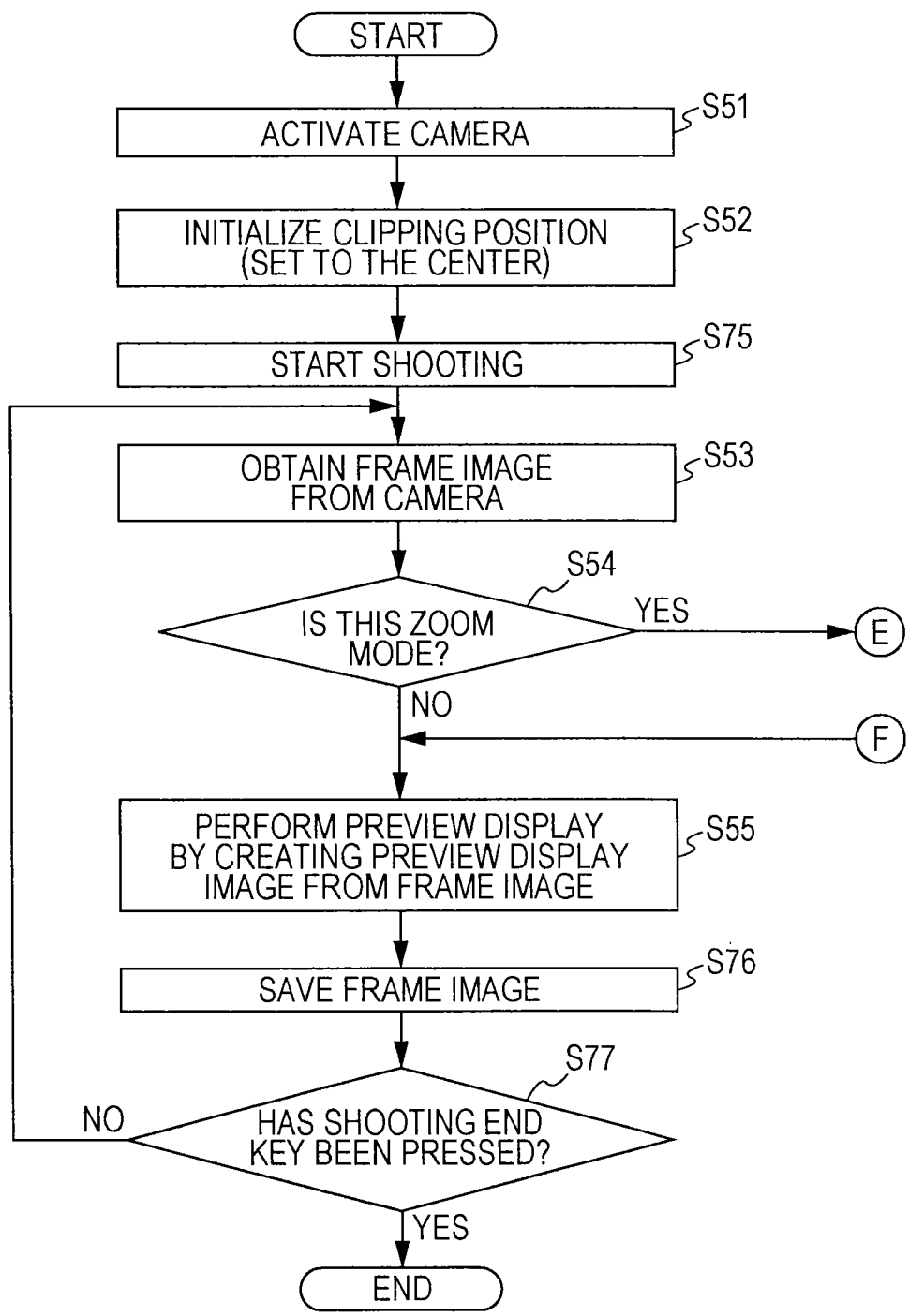
FIG. 23 is a flowchart illustrating a processing portion of camera activation, zoom mode determination, photographed frame saving, and so forth of processing causing the clipping image position to follow movement of a tracking reference image at the time of shooting a moving image, with the personal digital assistant according to the present embodiment.

FIG. 23 illustrates the flowchart of processing from camera unit activation up to photographed image saving at the time of executing processing causing the clipping image position to follow movement of the tracking reference image at the time of shooting a moving image, with the portable information terminal according to the present embodiment. Note that, with this flowchart in FIG. 23, in the event that determination is made in step S55 that the current mode is the zoom mode, the processing will proceed to processing in step S62 and thereafter in the flowchart in FIG. 22 described above. Also, the processing in step S62 and thereafter in FIG. 22 is the same as described above, and accordingly, description thereof will be omitted. Also, with the present embodiment, the processing in the flowchart in FIG. 23 is realized by the control/computing unit 12 executing the image photography control program according to the present embodiment to control the camera control/photographed signal processing unit 22, video signal processing unit 20, and touch panel control unit 24.

With the flowchart in FIG. 23, the control/computing unit 12 controls, as processing in step S52, the video signal processing unit 20 to perform initialization of the clipping position (e.g., initialization such as the input image 40 being taken as the center coordinates or the like), and advances the processing to step S75.

Upon proceeding to the processing in step S75, the control/computing unit 12 waits for moving image shooting start instructions being input from the photographer, for example, through operations as to key operating unit 32 or touch panel 25, and upon moving image shooting start instructions being input, advances the processing to the above step S53.

Upon proceeding to the processing in step S53, the control/computing unit 12 starts, through the camera control/photographed signal processing unit 22, imaging of a frame image using the camera unit 23 for shooting a moving image, and transmits the frame image from the camera unit 23 to the video signal processing unit 20 as the input image 40. The video signal processing unit 20 which has received the input image 40 of this frame generates a preview image 50 from this input image 40, and displays this preview image 50 on the screen of the display panel 21.

Also, the control/computing unit 12 determines, as processing in step S54, whether or not transition instructions to the zoom mode have been input from the photographer, or whether or not transition to the zoom mode has already been performed, for example, through operations as to the touch panel 25 or key operating unit 32, as described above. In the event that determination is made in this step S54 that the current mode is not the zoom mode, the control/computing unit 12 advances the processing to step S55, and on the other hand, in the event that determination is made that the current mode is the zoom mode, advances the processing to step S62 in FIG. 22.

Also, with the flowchart in FIG. 23, upon proceeding to step S55 after determination is made in step S54 that the current mode is not the zoom mode, or upon proceeding to processing in step S55 from step S67 in FIG. 22, the control/computing unit 12 displays the preview image 50 made up of the enlarged image on the display panel 21.

Next, the control/computing unit 12 saves the data of each frame image of the preview image 50 made up of the enlarged image in a predetermined storage location, for example, such as the memory unit 13 or the like, as processing in step S76.

Thereafter, the control/computing unit 12 monitors whether or not instructions for ending shooting of moving images have been performed from the photographer, for example, through operations as to the key operating unit 32 or touch panel 25 as processing in step S77, and in the event that instructions for ending shooting of moving images have not been performed, returns the processing to step S53, and on the other hand, in the event that instructions for ending shooting of moving images have been performed, ends the processing of the flowchart in FIG. 23.

[Auxiliary Display at Time of Tracing Zoom Enlarged Image According to Movement of Tracking Reference Image]

Figure 24:
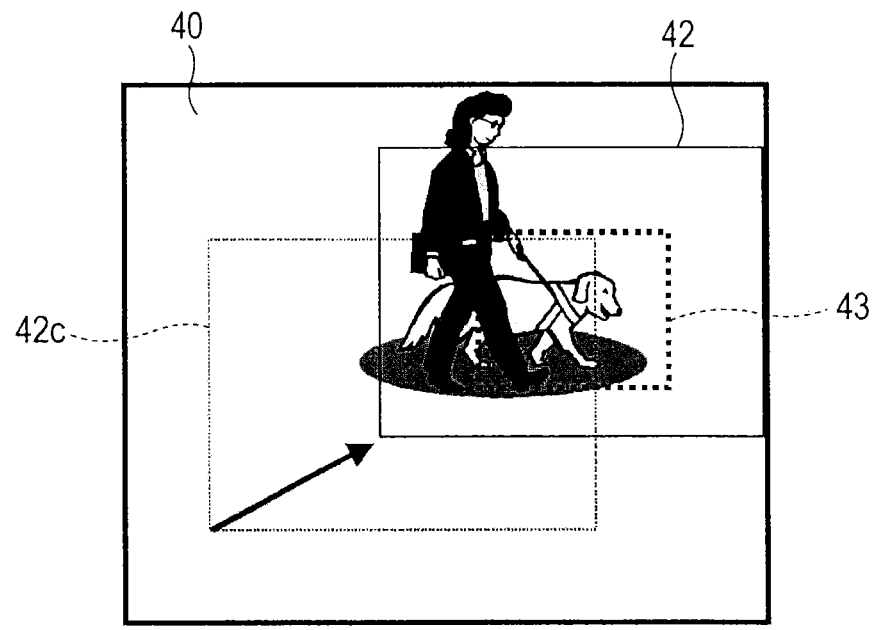
FIG. 24 is a diagram illustrating a state in which there is a great chance that a clipped image will approach an edge portion of an input image at the time of causing the clipped image to follow movement of a tracking reference image, with the personal digital assistant according to the present embodiment.

With the present embodiment, the clipped image 42 is an image clipped from the input image 40, and accordingly, it is difficult to clip an image deviated from this input image 40, for example. Specifically, as described above, in the event of causing the clipped image 42 to follow movement of the tracking reference image 43, for example, as shown in FIG. 24, upon the clipped image 42 reaching an edge portion of the input image 40, it is difficult to move the clipped image 42 any more unless the camera itself is moved for example.

Figure 25:
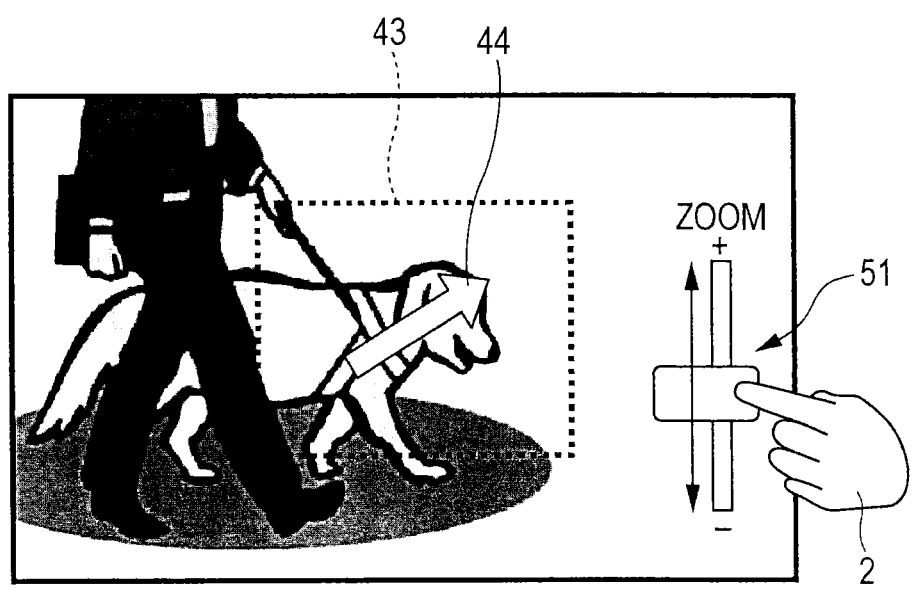
FIG. 25 is a diagram illustrating an example wherein an arrow icon used as an aid at the time of the photographer moving the photography range of the camera unit on a preview image is displayed when a clipped image approaches an edge portion of an input image according to movement of a tracking reference image, with the present embodiment.

Therefore, with the portable information terminal according to the present embodiment, for example, in the event that there is a great chance that the clipped image 42 will approach an edge portion of the input image 40, for example as shown in FIG. 25, an icon 44 such as an arrow or the like on the preview image 50, which is available as an aid when the photographer moves a range to be photographed by the camera unit 23 of this personal digital assistant. Specifically, the personal digital assistant according to the present embodiment clearly specifies as to the photographer that the photography range of the camera unit 23 has to be moved, i.e., enables a direction where the photography direction of the camera has to be moved to be clearly specified by displaying the icon 44 such as the arrow or the like on the screen.

Figure 26:
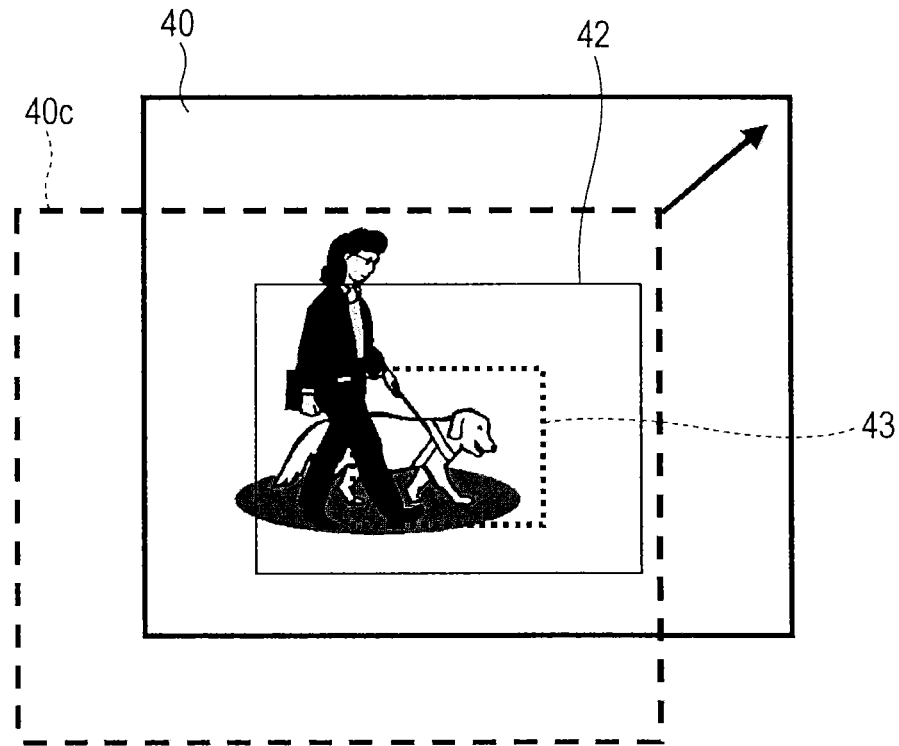
FIG. 26 is a diagram used for description of a scene where the photographer moves the camera photography direction in response to the specification using the arrow icon for an aid, whereby a clipped image moves away from the edge portion of an input image 40 and positioned near the center, with the present embodiment.

In the event that the photographer has moved the photography direction of the camera unit 23 to the direction specified by the icon 44 such as the arrow or the like, an input image from this camera unit 23 becomes from an input image 40c before movement to the photography direction to an input image 40 after movement, as shown in FIG. 26. Thus, the clipped image 42 is positioned apart from the edge position of the input image 40 thereof near the center, and accordingly, the personal digital assistant according to the present embodiment can further cause this clipped image 42 to follow movement of the tracking reference image 43.

[Size Change of Tracking Reference Image and Size Change of Clipped Image According to Change in Photography Distance]

The camera unit 23 of the personal digital assistant according to the present embodiment includes an autofocus function, and accordingly, even in the event that distance from the camera unit 23 to a subject has been changed, the focus function serves so as to follow distance change thereof. Also, the personal digital assistant according to the present embodiment is configured so as to measure distance from the camera unit 23 to a subject using autofocus processing of this autofocus function. Note that distance change from the camera unit 23 to a subject can also be measured from, for example, change in the size of a subject image on the input image 40, or change in the size of an object image within the tracking reference image.

In the event that distance change from the camera unit 23 to a subject has been detected based on distance change measured by the autofocus, or distance change measured from change in the size of the object image, the personal digital assistant according to the present embodiment calculates the distance change thereof, and according to the result of this distance change calculation, also calculates a size that should be taken as the size of the tracing reference image. The personal digital assistant according to the present embodiment is configured, for example as shown in FIG. 27, so as to change the size of the tracking reference image according to the calculated size.

Figure 27:
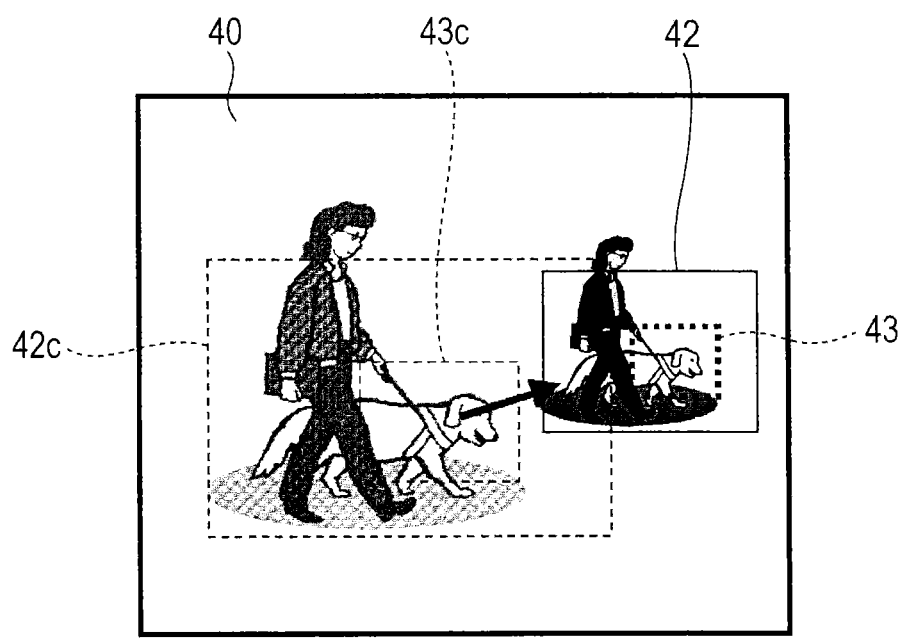
FIG. 27 is a diagram used for description of size change in a tracking reference image, and size change in a clipped image according to change in photography distance.

Similarly, in the event that distance from the camera unit 23 to a subject has been changed, according to the results of distance change calculation, as shown in FIG. 27, the personal digital assistant according to the present embodiment is configured so as to change the clipping size (i.e., zoom power) at the time of clipping an image from the input image 40. Note that the example in FIG. 27 illustrates an example wherein distance between the camera unit 23 to a subject is increased, whereby the size of a tracking reference image 43c before distance change thereof is reduced to the size of the tracking reference image 43 after distance change, and also the size of a clipped image 42c before distance change is reduced to the size of the clipped image 42 after distance change.

Specifically, in the event that distance from the camera unit 23 to a subject has been changed, and accordingly, the size itself of a reference image such as a desired subject or the like within the input image 40 has been changed, with the personal digital assistant according to the present embodiment, a scale (i.e., zoom power) at the time of image clipping can be changed so as to match the size of the reference image such as the subject after change thereof, or the like.

[Flowchart of Size Change Processing of Tracking Reference Image and Clipped Image According to Change in Photography Distance]

Figure 28:
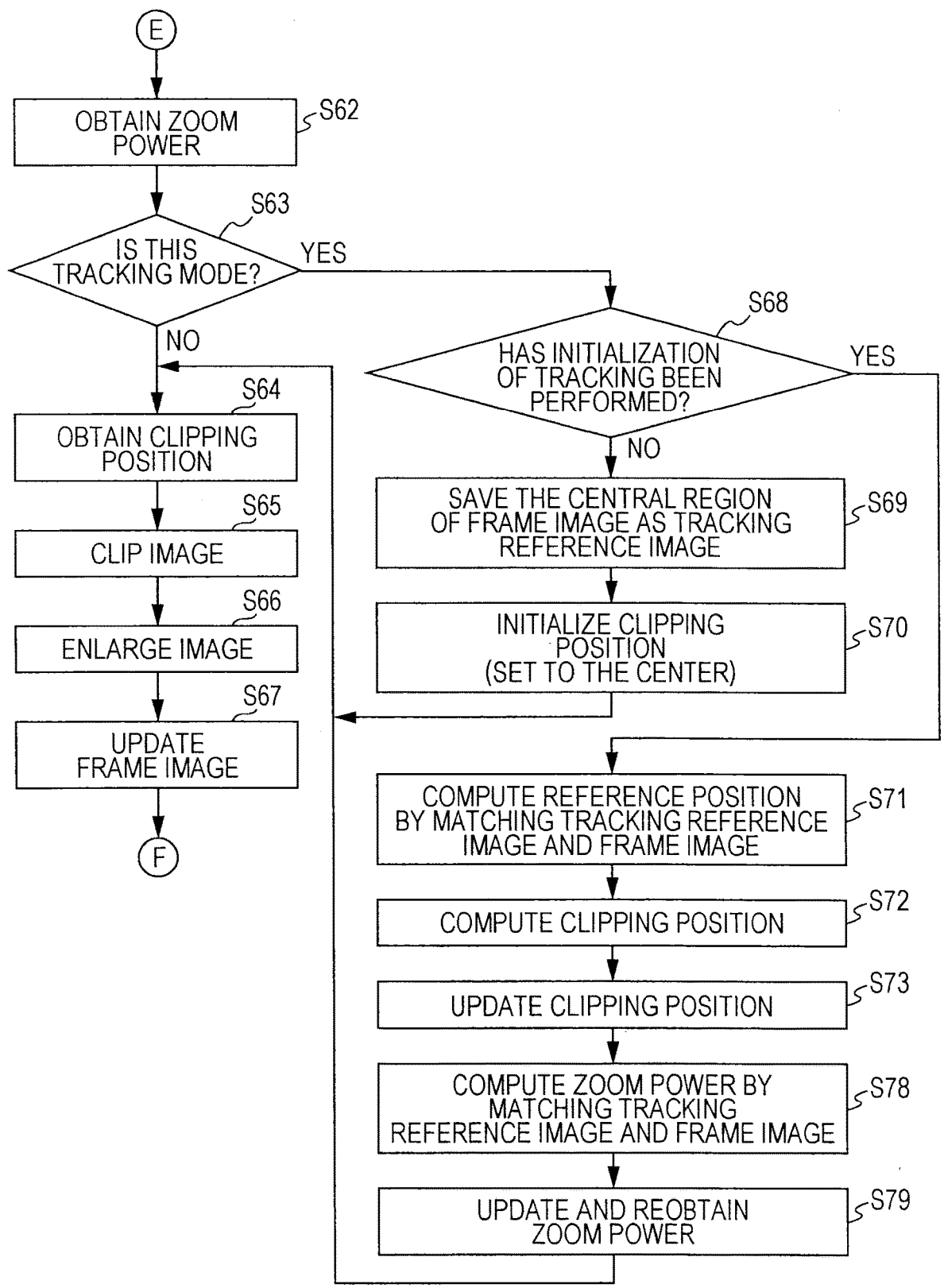
FIG. 28 is a flowchart illustrating the flow of size change processing of a tracking reference image and a clipped image according to change in photography distance, with the present embodiment.

FIG. 28 illustrates the flowchart of the size change processing of a tracking reference image and a clipped image according to change in photography distance. Note that the processing of the flowchart in FIG. 28 can be realized as processing substituting for the flowchart in FIG. 22 of the flowchart described with reference to FIG. 21 and FIG. 22, and flowchart described with reference to FIG. 23 and FIG. 22. Also, with this flowchart in FIG. 28, the same processes as with the flowchart in FIG. 22 are denoted with the same reference numerals, and description thereof will be omitted.

With the flowchart shown in FIG. 28, upon the processing in step S73 being completed, the control/computing unit 12 advances the processing to step S78.

Upon proceeding to the processing in step S78, the control/computing unit 12 computes, based on change in distance measured by the autofocus function as described above, or change in the size by matching between the tracking reference image 43 and the input image 40 of the frames, a size for clipping the image from these input images 40, i.e., zoom power.

The control/computing unit 12 updates and re-obtains the zoom power obtained so far using the zoom power obtained in step S78, as processing in step S79. After this processing in step S79, the control/computing unit 12 advances the processing to step S64 as described above.

[Optional Selection of Tracking Reference Image]

With the above description, though an example has been shown wherein at the time of the initial setting of the tracking reference image 43, this tracking reference image 43 is automatically set to the center position of the input image 40, this tracking reference image 43 may be set to an optional position or size, for example, in response to instruction input from the photographer via the touch panel 25.

Figure 29:
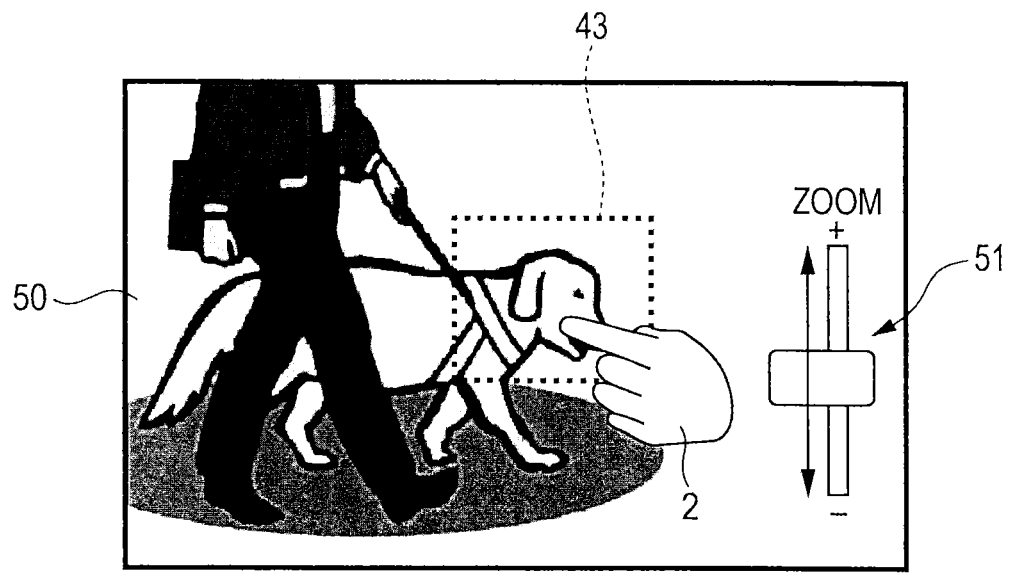
FIG. 29 is diagram used for description of a scene where the photographer's desired tracking reference image is set, for example, by the photographer specifying, for example, a center portion of a preview image using contact of a finger or the like, with the present embodiment.
Figure 30:
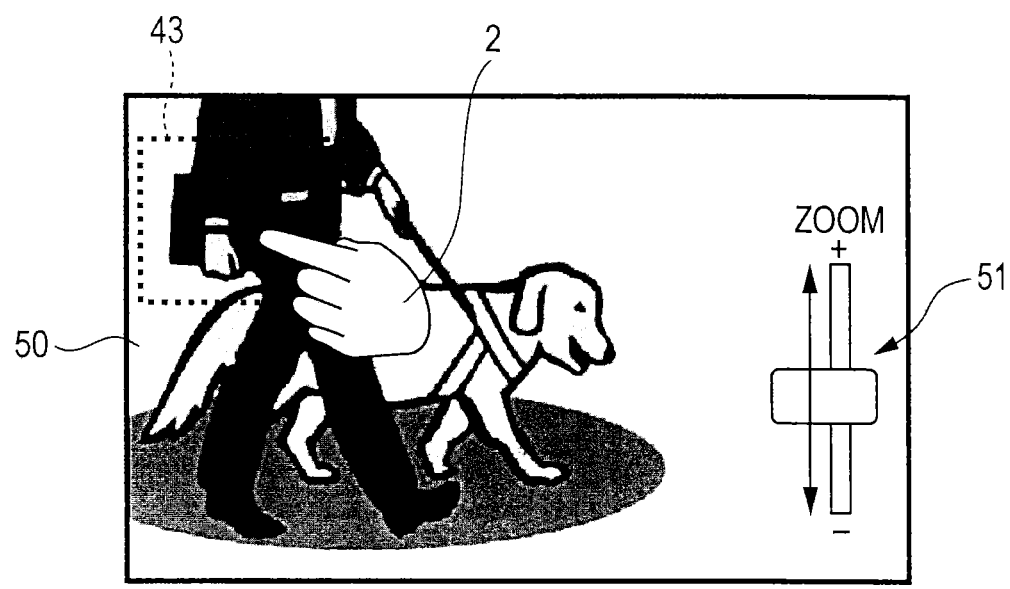
FIG. 30 is a diagram used for description of a scene where the photographer's desired tracking reference image is set, for example, by the photographer specifying, for example, an upper left portion of a preview image using contact of a finger or the like, with the present embodiment.

Specifically, for example as shown in FIG. 29 and FIG. 30, when the photographer specified a desired tracking reference image 43 by contact such as a finger or the like of the hand 2 within the preview image 50, the personal digital assistant according to the present embodiment selects this as the tracking reference image 43.

Note that an object to be specified by the photographer performing selection instructions via the touch panel 25 is not restricted to the tracking reference image 43 having a predetermined size, and for example, a desired object image portion within the preview image 50 may be specified by finger or the like with selection instructions. In this case, when a desired object image portion has been specified within the preview image 50 by the photographer, the personal digital assistant according to the present embodiment determines that the object image portion thereof has been selected by the photographer, and selects an image region having a predetermined size including this selected object image portion as the tracking reference image 43.

Thus, the personal digital assistant according to the present embodiment can cause the clipped image 42 to follow movement of the tracking reference image 43 optionally select-specified by the photographer. Therefore, according to the present embodiment, the photographer can perform shooting of a moving image wherein a desired subject image is placed in an intended position easily and in a sure manner at the time of the digital zoom without performing work such as movement or directional change of the camera for example.

[Flow of Processing in Case of Optional Selection of Tracking Reference Image Performed at Time of Shooting of Still Image]

Figure 31:
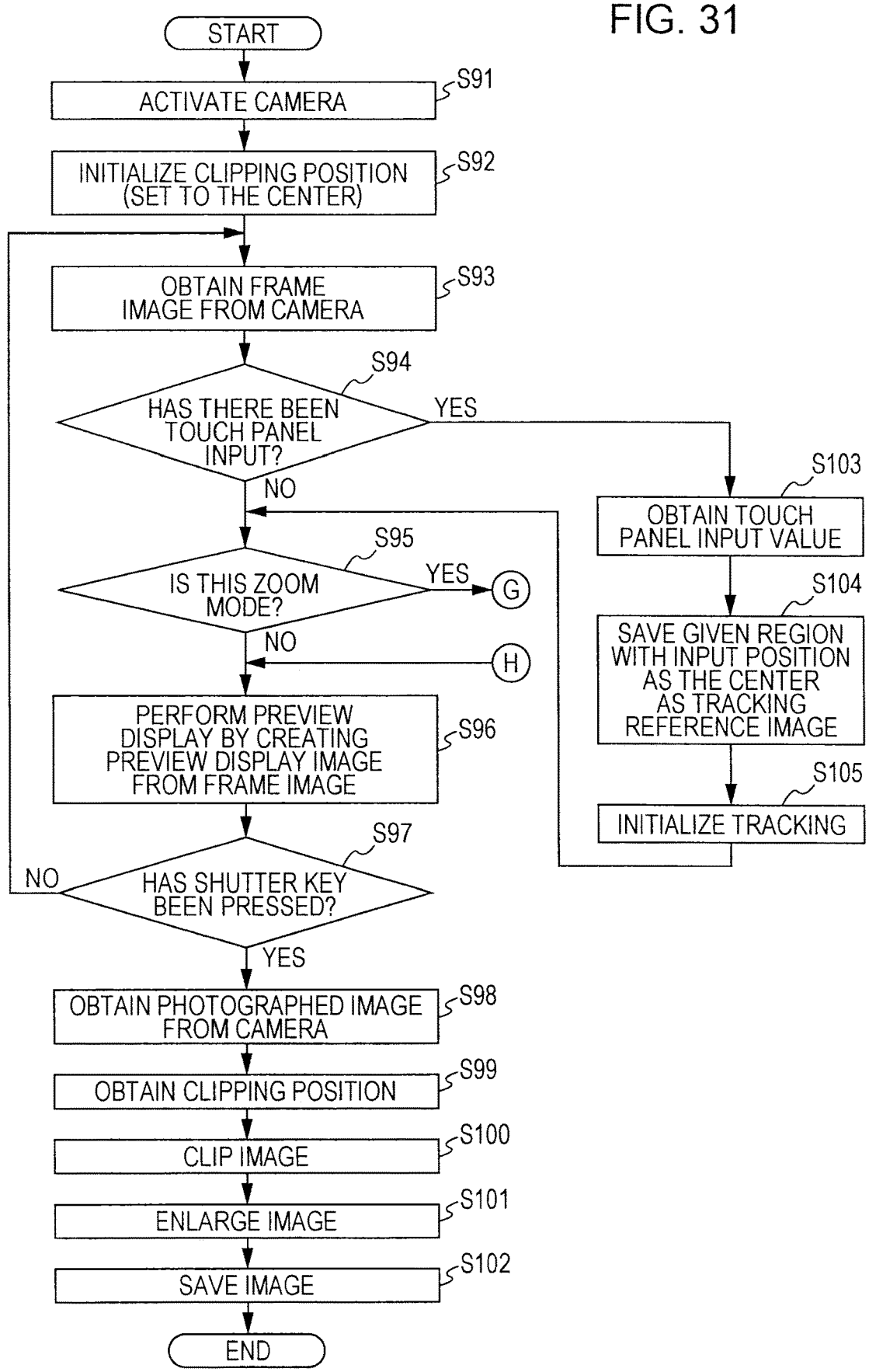
FIG. 31 is a flowchart of a processing portion of camera activation, touch panel input determination, zoom mode determination, and photographed frame saving, and so forth of processing from camera unit activation to photographed image saving when executing processing for the photographer optionally selecting a tracking reference image at the time of shooting a still image, with the personal digital assistant according to the present embodiment.
Figure 32:
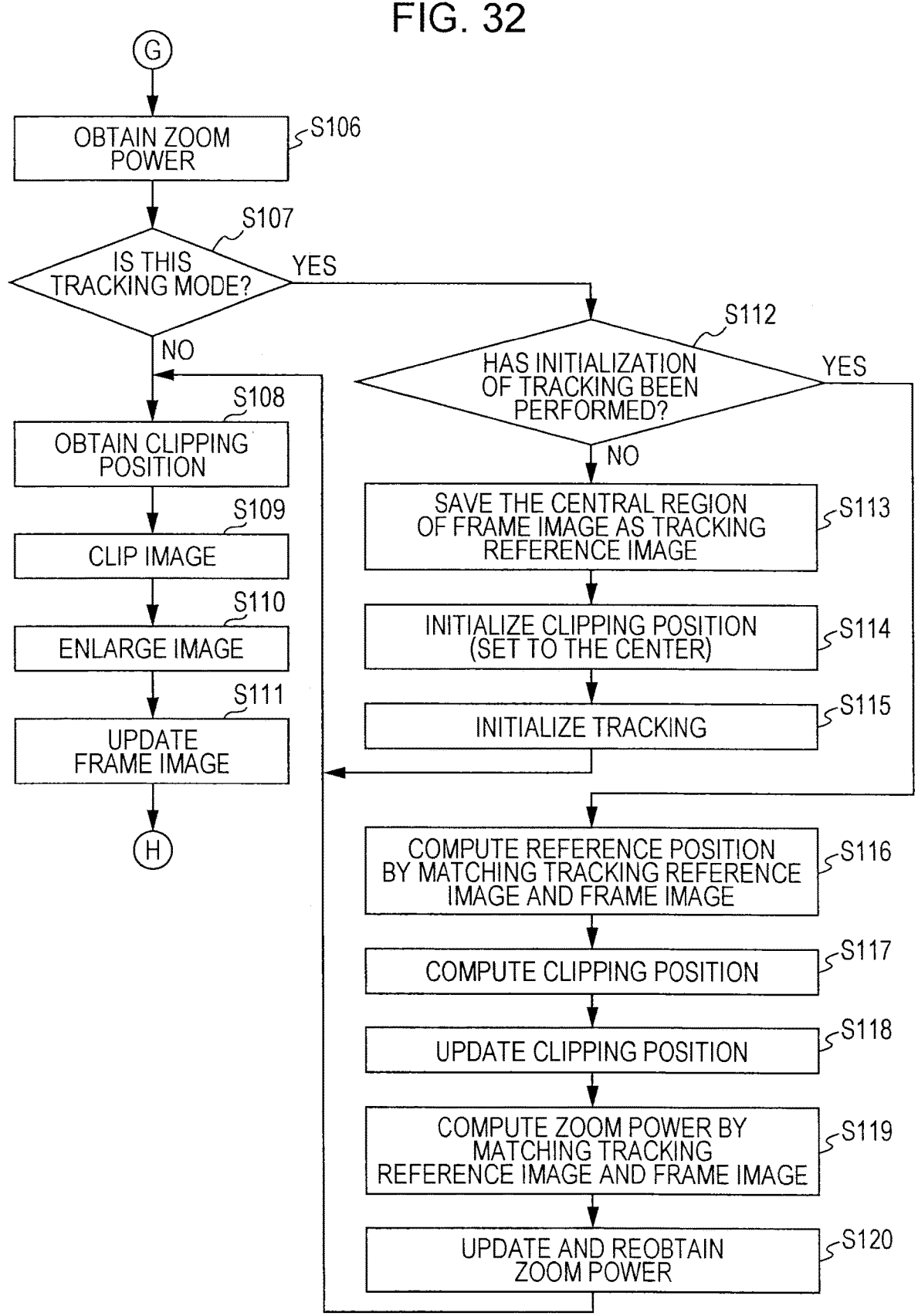
FIG. 32 is a flowchart of a processing portion of the zoom mode being determined and thereafter of processing from camera unit activation to photographed image saving at the time of executing processing for the photographer optionally selecting a tracking reference image, with the personal digital assistant according to the present embodiment.

FIG. 31 and FIG. 32 illustrate the flowchart of processing from camera unit activation up to image saving at the time of executing processing for the photographer optionally selecting a tracking reference image at the time of shooting of a still image for example, with the personal digital assistant according to the present embodiment. Note that the processing of the flowchart in FIG. 31 and FIG. 32 is realized by the control/computing unit 12 executing the image photography control program according to the present embodiment to control the camera control/photographed signal processing unit 22, video signal processing unit 20, and touch panel control unit 24.

With the flowchart in FIG. 31, upon camera activation instructions being input from the photographer, for example, through operations of the key operating unit 32 or touch panel 25, the control/computing unit 12 starts the processing of this flowchart, and activates, through the camera control/imaged signal processing unit 22, the camera unit 23 as processing in step S91.

Also, upon the camera unit 23 being activated, the control/computing unit 12 controls the video signal processing unit 20 to perform initialization of the clipping position (e.g., initialization such that the input image 40 is taken as the center coordinates) as processing in step S92.

Next, the control/computing unit 12 starts, as processing in step S73, through the camera control/photographed signal processing unit 22, imaging of a frame image using the camera unit 23 for preview image display, and transmits the frame image from the camera unit 23 to the video signal processing unit 20 as the input image 40. The video signal processing unit 20 which has received the input image 40 of this frame generates a preview image 50 from this input image 40, and displays this preview image 50 on the screen of the display panel 21.

Next, the control/computing unit 12 monitors the touch panel 25 via the touch panel 24, and when not detecting that input has been performed by the photographer through this touch panel 25, advances the processing to step S95, and when detecting that input has been performed, advances the processing to step S103.

Upon proceeding to the processing in step S103, the control/computing unit 12 obtains the input values transmitted from the touch panel 25.

Next, the control/computing 12 saves, as processing in step S104, an image region with a certain size with the coordinate position based on the input values from the touch panel 25 as the center, as the tracking reference image 43.

Also, the control/computing unit 12 performs initialization for executing the object tracking processing using the tracking reference image 43, as processing in step S105. After this processing in step S105, the control/computing unit 12 advances the processing to step S95.

Upon proceeding to the processing in step S95, the control/computing unit 12 determines whether or not transition instructions to the zoom mode has been input from the photographer through operations as to the touch panel 25 or key operating unit 32, or whether or not transition to the zoom mode has already been performed. In the event that determination is made in this step S95 that the current mode is not the zoom mode, the control/computing unit 12 advances the processing to step S96, and on the other hand, in the event that determination is made that the current mode is the zoom mode, advances the processing to step S106 in FIG. 32.

In the event of advancing the processing to step S106 in FIG. 32, the control/computing unit 12 obtains the zoom power set at this time, and advances the processing to step S107. Note that the photographer can specify the zoom power, for example, through operations as to the touch panel 25 or key operating unit 32.

Upon proceeding to the processing in step S107, the control/computing unit 12 monitors whether or not instruction input for starting the operation of the object tracking has been obtained from the touch panel 25 via the touch panel control unit 24, and in the event that instruction input for starting the operation of the object tracking has not been obtained from the touch panel 25, advances the processing to step S108, and on the other hand, in the event that instruction input for starting the operation of the object tracking has been obtained from the touch panel 25, advances the processing to step S112.

Upon proceeding to the processing in step S112, the control/computing unit 12 determines whether or not initialization for the object tracking has been performed, and in the event initialization has not been performed, advances the processing to step S113, and on the other hand, in the event that initialization has been performed, advances the processing to step S116.

In the event of proceeding to the processing in step S113, the control/computing unit 112 sets and saves an image region made up of a predetermined size in the center within the input image 40 that is a photographed frame as the tracking reference image 43.

Next, the control/computing unit 12 advances the processing to step S114, and initializes the position for clipping an image from the input image 40 based on the set tracking reference image 43. After this processing in step S114, the control/computing unit 12 advances the processing to step S115.

Upon proceeding to the processing in step S115, the control/computing unit 12 performs initialization for executing the object tracking processing wing the tracking reference image 43. After this processing in step S115, the control/computing unit 12 advances the processing to step S108.

Also, upon proceeding to the processing in step S108, the control/computing unit 12 transmits the set clipping position to the video signal processing unit 20.

Next, the control/computing unit 12 controls the video signal processing unit 20 to perform clipping of an image from the input image 40 with the clipping position as the center coordinates and, and with the size according to the zoom power, as processing in step S109.

Further, the control/computing unit 12 controls the video signal processing unit 20 to enlarge the image 42 clipped from the input image 40 according to the screen size of the display panel 21 as processing in step S110, and to update the enlarged image thereof as the preview image 50 as processing in step S111.

After this processing in step S111, the control/computing unit 12 advances the processing to step S96 in FIG. 31.

On the other hand, in the event of proceeding to the processing in step S116 from step S112 in FIG. 32, the control/computing unit 12 matches the tracking reference image 43 and the input image 40 for each frame, and obtains the position of the tracking reference image 43 for each frame.

Next, the control/computing unit 12 computes the position for clipping an image from the input image 40 for each frame based on the position of the tracking reference image 43 as processing in step S117.

Next, the control/computing unit 12 updates the clipping position obtained so far using the clipping position obtained in step S117 as processing in step S118. Thus, upon the tracking reference image 43 moving between the frames, the image clipping position between the frames will be updated following movement of this tracking reference image 43. After this updating processing in step S118, the control/computing unit 12 advances the processing to step S119.

Upon proceeding to the processing in step S119, the control/computing unit 12 matches, for example, the tracking reference image 43 and the input image 40 for each frame to compute the zoom power.

Next, the control/computing unit 12 updates the zoom power obtained so far using the zoom power obtained in step S119 as processing in step S120. After this processing in step S120, the control/computing unit 97 advances the processing to step S108.

Also, upon proceeding to step S97 in FIG. 31 from step S111 in FIG. 32, the control/computing unit 12 displays the preview image 50 made up of the enlarged image on the display panel 21.

Next, the control/computing unit 12 monitors whether or not the shutter key of the key operating unit 32 has been pressed by the photographer, as processing in step S97. In the event that the shutter key has not been pressed, the control/computing unit 12 returns the processing to step S93, and in the event that determination is made that the shutter key has been pressed, advances the processing to step S98.

Upon proceeding to the processing in step S98, the control/computing unit 12 obtains the image photographed at the camera unit 23 at the time of the shutter key being pressed, from the camera control/imaged signal processing unit 24. The control/computing unit 12 then obtains the clipping position previously updated as processing in step S99, and also clips an image from the photographed image at the clipping position as processing in step S100, and further enlarges the clipped image thereof as processing in step S101, and then saves the data of this enlarged image, for example, in a predetermined storage place such as the memory unit 13 or the like as processing in step S102. Note that clipping and enlargement of the image may also be performed by the video signal processing unit 20.

Thereafter, in the event that instructions for ending imaging using the camera have been performed by the photographer, for example, through operations as to the key operating unit 32 or touch panel 25, the control/computing unit 12 ends the processing of the flowchart in FIG. 31 and FIG. 32. Note that, in the event that instructions for ending imaging using the camera have not been performed by the photographer, the control/computing unit 12 may return the processing to step S92.

[Flow of Processing in Case of Optional Selection of Tracking Reference Image being Performed at Time of Shooting Moving Image]

Figure 33:
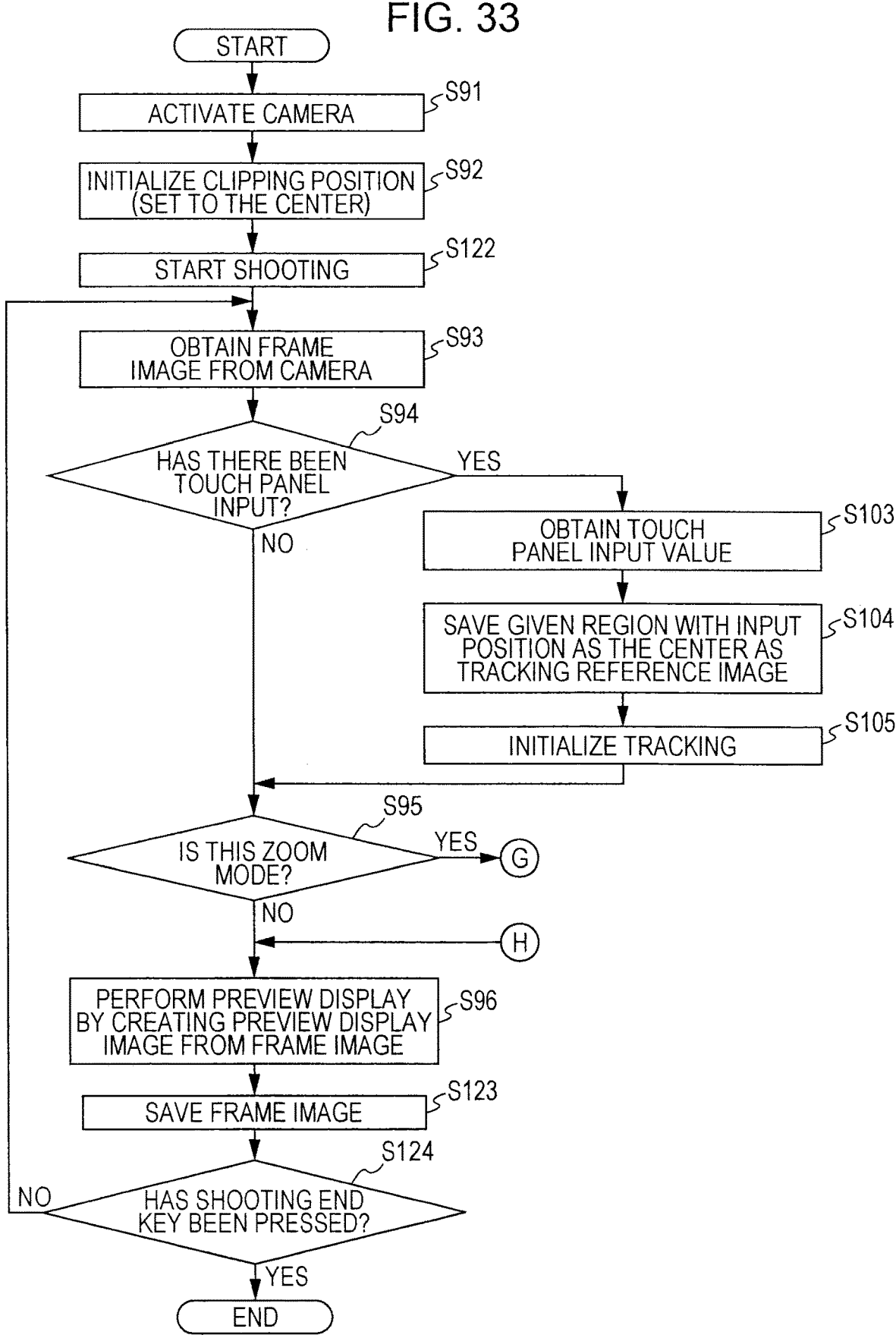
FIG. 33 is a flowchart of a processing portion of camera activation, touch panel input determination, zoom mode determination, and photographed frame saving, and so forth of processing from camera unit activation to photographed image saving when executing processing for the photographer optionally selecting a tracking reference image at the time of shooting a moving image, with the personal digital assistant according to the present embodiment.

FIG. 33 illustrates the flowchart of processing in the case of optional selection of a tracking reference image being performed at the time of shooting a moving image with the personal digital assistant according to the present embodiment. Note that, with this flowchart in FIG. 33, in the event that determination is made in step S95 that the current mode is the zoom mode, the processing will proceed to processing in step S106 and thereafter in the flowchart in FIG. 32 described above. Also, the processing in step S106 and thereafter in FIG. 32 is the same as described above, and accordingly, description thereof will be omitted. Also, with the present embodiment, the processing in the flowchart in FIG. 33 is realized by the control/computing unit 12 executing the image photography control program according to the present embodiment to control the camera control/photographed signal processing unit 22, video signal processing unit 20, and touch panel control unit 24.

With the flowchart in FIG. 33, the control/computing unit 12 controls, as processing in step S92, the video signal processing unit 20 to perform initialization of the clipping position (e.g., initialization such as the input image 40 being taken as the center coordinates or the like), and advances the processing to step S122.

Upon proceeding to the processing in step S122, the control/computing unit 12 waits for moving image shooting start instructions being input from the photographer, for example, through operations as to key operating unit 32 or touch panel 25, and upon moving image shooting start instructions being input, advances the processing to the above step S93.

Upon proceeding to the processing in step S93, the control/computing unit 12 starts, through the camera control/photographed signal processing unit 22, imaging of a frame image using the camera unit 23 for shooting a moving image, and transmits the frame image from the camera unit 23 to the video signal processing unit 20 as the input image 40. The video signal processing unit 20 which has received the input image 40 of this frame generates a preview image 50 from this input image 40, and displays this preview image 50 on the screen of the display panel 21.

Also, the control/computing unit 12 determines, as processing in step S95 as described above, whether or not transition instructions to the zoom mode have been input from the photographer, or whether or not transition to the zoom mode has already been performed, for example, through operations as to the touch panel 25 or key operating unit 32. In the event that determination is made in this step S95 that the current mode is not the zoom mode, the control/computing unit 12 advances the processing to step S96, and on the other hand, in the event that determination is made that the current mode is the zoom mode, advances the processing to step S106 in FIG. 32.

Also, with the flowchart in FIG. 33, upon proceeding to step S96 after determination is made in step S95 that the current mode is not the zoom mode, or upon proceeding to processing in step S96 from step S111 in FIG. 23, the control/computing unit 12 displays the preview image 50 made up of the enlarged image on the display panel 21.

Next, the control/computing unit 12 saves the data of each frame image of the preview image 50 made up of the enlarged image in a predetermined storage location, for example, such as the memory unit 13 or the like, as processing in step S123.

Thereafter, the control/computing unit 12 monitors whether or not instructions for ending shooting of moving images have been performed from the photographer, for example, through operations as to the key operating unit 32 or touch panel 25 as processing in step S124, and in the event that instructions for ending shooting of moving images have not been performed, returns the processing to step S93, and on the other hand, in the event that instructions for ending shooting of moving images have been performed, ends the processing of the flowchart in FIG. 33.

[Display of Input Image onto Preview Image]

Figure 34:
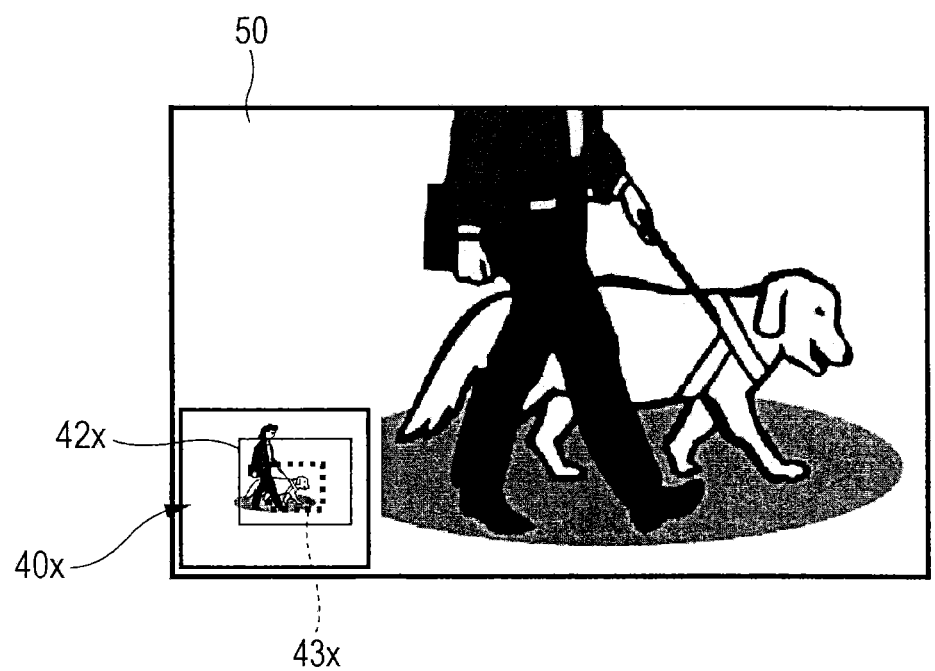
FIG. 34 is a diagram illustrating an example wherein an input image, a tracking reference range, and so forth are displayed on a preview image with the personal digital assistant according to the present embodiment.

With the personal digital assistant according to the embodiment, at the time of an enlarged image as described above being displayed on the display panel 21 as the preview image 50, for example as shown in FIG. 34, the entire reduced image 40x reduced from the entire input image 40 before being enlarged, a clipped reduced image 42x representing the clipped image 42 within the entire reduced image 40x, and further, in the event that the tracking reference image 43 is set, a reduced reference image 43x representing the tracking reference image 43 thereof can be displayed on a predetermined position on the screen.

Thus, the photographer can recognize what kind of image is captured by the imaging sensor of the camera unit 23, and also recognize which range within the input image 40 is enlarged.

[General Overview]

An image photography apparatus according to an embodiment of the present disclosure includes: a camera unit including an imaging sensor for photographing an image; a display panel unit including a screen capable of displaying an image; an image clipping unit configured to clip an image region having a size corresponding to a photography zoom power from an input image photographed by an imaging sensor of the camera unit; a clipping position adjustment unit configured to adjust a clipping position at the time of the image clipping unit clipping the image region from the input image; and an image enlargement display unit configured to enlarge and display the image region that the image clipping unit clipped on the screen of the display panel.

Also, the image photography apparatus according to the present embodiment of the present disclosure includes: a user interface unit configured to detect operation instruction input from a photographer; with the clipping position adjustment unit adjusting the direction of a clipping position of the image region at the time of the image clipping unit clipping from the input image based on the operation instruction input direction according to the photographer detected by the user interface unit.

Also, the clipping position adjustment unit adjusts the movement amount of a clipping position of the image region at the time of the image clipping unit clipping from the input image based on the speed of the operation instruction input according to the photographer detected by the user interface unit.

The clipping position adjustment unit adjusts the movement amount of a clipping position of the image region at the time of the image clipping unit clipping from the input image based on the length of the operation instruction input according to the photographer detected by the user interface unit.

The user interface unit is made up of a touch panel including a detection area generally covering the entire screen of the display panel unit.

Also, the image photography apparatus according to the present embodiment of the present disclosure includes: a tracking reference image tracing unit configured to trace, regarding a desired tracking reference image within the input image made up of the frames of a moving image, movement between the frames; with the image clipping unit clipping the image region including the tracking reference image; and with the clipping position adjustment unit causing the clipping position of the image region to follow movement of the tracking reference image that the tracking reference image tracing unit traces between the frames.

Also, the image photography apparatus according to the present embodiment of the present disclosure includes: a user interface unit configured to detect operation instruction input from a photographer; with the tracking reference image tracing unit determining the desired tracking reference image within the input image based on the operation instruction input position according to the photographer that the user interface unit detected.

The frames making up the moving image are the frames of a moving image making up a preview image at the time of shooting of a still image.

The image enlargement display unit may display reduced images reduced from the input image, the image region within this input image, and the tracking reference image within this image region on the screen of the display panel which enlarges and displays the image region.

Also, the image photography apparatus according to the present embodiment of the present disclosure includes: an icon generating and display unit configured to display on the screen of the display panel unit a movement instruction direction icon for instructing a photographer to move a photography range according to an imaging sensor of the camera unit so that the image region is placed around the center of the input image, when the image region clipped by the image clipping unit is near an edge portion of the input image.

Also, the image photography apparatus according to the present embodiment of the present disclosure includes: a distance determining unit configured to determine distance from a subject photographed by the camera unit to this camera unit; with the image clipping unit adjusting the size of an image region clipped from the input image according to distance from the camera unit to a subject determined by the distance determining unit.

An image photography control program according to an embodiment of the present disclosure of an image photography apparatus including a camera unit including an imaging sensor for photographing an image, and a display panel unit including a screen capable of displaying an image, the image photography control program causing the image photography apparatus to serve as an image clipping unit configured to clip an image region having a size corresponding to a photography zoom power from an input image photographed by an imaging sensor of the camera unit; a clipping position adjustment unit configured to adjust a clipping position at the time of the image clipping unit clipping the image region from the input image; and an image enlargement display unit configured to enlarge and display the image region that the image clipping unit clipped on the screen of the display panel.

Also, the image photography apparatus according to the present embodiment of the present disclosure includes a user interface unit configured to detect operation instruction input from a photographer, and with the image photography control program according to the present embodiment in this case, the clipping position adjustment unit adjusts the direction of a clipping position of the image region at the time of the image clipping unit clipping from the input image based on the operation instruction input direction according to the photographer detected by the user interface unit.

Also, with the image photography control program according to the present embodiment, the clipping position adjustment unit adjusts the movement amount of a clipping position of the image region at the time of the image clipping unit clipping from the input image based on the speed of the operation instruction input according to the photographer detected by the user interface unit.

Also, with the image photography control program according to the present embodiment, the clipping position adjustment unit adjusts the movement amount of a clipping position of the image region at the time of the image clipping unit clipping from the input image based on the length of the operation instruction input according to the photographer detected by the user interface unit.

Note that the user interface unit is made up of a touch panel including a detection area generally covering the entire screen of the display panel unit.

Also, the image photography control program according to the present embodiment includes: a tracking reference image tracing unit configured to trace, regarding a desired tracking reference image within the input image made up of the frames of a moving image, movement between the frames; with the image clipping unit clipping the image region including the tracking reference image; and with the clipping position adjustment unit causing the clipping position of the image region to follow movement of the tracking reference image that the tracking reference image tracing unit traces between the frames.

Also, the image photography apparatus according to the present embodiment of the present disclosure includes: a user interface unit configured to detect operation instruction input from a photographer, with the image photography control program according to the present embodiment in this case, the tracking reference image tracing unit determines the desired tracking reference image within the input image based on the operation instruction input position according to the photographer that the user interface unit detected.

With the image photography control program according to the present embodiment, the image enlargement display unit may display reduced images reduced from the input image, the image region within this input image, and the tracking reference image within this image region on the screen of the display panel which enlarges and displays the image region.

Also, the image photography control program according to the present embodiment includes: an icon generating and display unit configured to display on the screen of the display panel unit a movement instruction direction icon for instructing a photographer to move a photography range according to an imaging sensor of the camera unit so that the image region is placed around the center of the input image, when the image region clipped by the image clipping unit is near an edge portion of the input image.

Also, the image photography control program according to the present embodiment includes: a distance determining unit configured to determine distance from a subject photographed by the camera unit to this camera unit; with the image clipping unit adjusting the size of an image region clipped from the input image according to distance from the camera unit to a subject determined by the distance determining unit.

A storage medium according to an embodiment of the present disclosure configured to record an image photography control program of an image photography apparatus including a camera unit including an imaging sensor for photographing an image, and a display panel unit including a screen capable of displaying an image, the image photography control program causing the image photography apparatus to serve as an image clipping unit configured to clip an image region having a size corresponding to a photography zoom power from an input image photographed by an imaging sensor of the camera unit; a clipping position adjustment unit configured to adjust a clipping position at the time of the image clipping unit clipping the image region from the input image; and an image enlargement display unit configured to enlarge and display the image region that the image clipping unit clipped on the screen of the display panel.

Further, an image photography control method according to an embodiment of the present disclosure is a control method of an image photography apparatus including a camera unit including an imaging sensor for photographing an image, and a display panel unit including a screen capable of displaying an image, and with the image photography control method, an image clipping unit clips an image region having a size corresponding to a photography zoom power from an input image photographed by an imaging sensor of the camera unit, a clipping position adjustment unit adjusts a clipping position at the time of the image clipping unit clipping the image region from the input image, and an image enlargement display unit enlarges and displays the image region that the image clipping unit clipped on the screen of the display panel.

Also, the image photography apparatus according to the present embodiment of the present disclosure includes a user interface unit configured to detect operation instruction input from a photographer, and with the image photography control method according to the present embodiment in this case, the clipping position adjustment unit adjusts the direction of a clipping position of the image region at the time of the image clipping unit clipping from the input image based on the operation instruction input direction according to the photographer detected by the user interface unit.

Also, with the image photography control method according to the present embodiment, the clipping position adjustment unit adjusts the movement amount of a clipping position of the image region at the time of the image clipping unit clipping from the input image based on the speed of the operation instruction input according to the photographer detected by the user interface unit.

Also, with the image photography control method according to the present embodiment, the clipping position adjustment unit adjusts the movement amount of a clipping position of the image region at the time of the image clipping unit clipping from the input image based on the length of the operation instruction input according to the photographer detected by the user interface unit.

Note that the user interface unit is made up of a touch panel including a detection area generally covering the entire screen of the display panel unit.

Also, with the image photography control method according to the present embodiment, a tracking reference image tracing unit traces, regarding a desired tracking reference image within the input image made up of the frames of a moving image, movement between the frames, the image clipping unit clips the image region including the tracking reference image, and the clipping position adjustment unit causes the clipping position of the image region to follow movement of the tracking reference image that the tracking reference image tracing unit traces between the frames.

Also, the image photography apparatus according to the present embodiment of the present disclosure includes: a user interface unit configured to detect operation instruction input from a photographer, with the image photography control method according to the present embodiment in this case, the tracking reference image tracing unit determines the desired tracking reference image within the input image based on the operation instruction input position according to the photographer that the user interface unit detected.

Also, with the image photography control method according to the present embodiment, the image enlargement display unit may display reduced images reduced from the input image, the image region within this input image, and the tracking reference image within this image region on the screen of the display panel which enlarges and displays the image region.

Also, with the image photography control method according to the present embodiment, when the image region clipped by the image clipping unit is near an edge portion of the input image, an icon generating and display unit displays on the screen of the display panel unit a movement instruction direction icon for instructing a photographer to move a photography range according to an imaging sensor of the camera unit and to place the image region around the center of the input image.

Also, with the image photography control method according to the present embodiment, a distance determining unit determines distance from a subject photographed by the camera unit to this camera unit, and the image clipping unit adjusts the size of an image region clipped from the input image according to distance from the camera unit to a subject determined by the distance determining unit.

As described above, the image photography apparatus according to the present embodiment of the present disclosure includes a user interface device which can instruct a movement direction and movement distance thereof and so forth, for example, such as a touch panel, a direction specifying key, or the like. At the time of the digital zoom, the image photography apparatus according to the present embodiment allows the photographer to place a subject in an intended position by moving a clipping position at the time of clipping an image region according to a zoom power from an input image based on direction and distance instructions through the user interface device or the like without moving the camera itself for fine adjustment. Also, at the time of the digital zoom, the image photography apparatus according to the present embodiment allows the photographer to fix a subject within the viewfinder for photographing without moving the camera as much as possible by performing object tracking according to the object tracking technique, and also allows the photographer to perform auxiliary display for this.

Note that the image photography device according to the present embodiment may be applied to, in addition to high-performance portable telephone terminals, tablet terminals, or slate PCs, not only portable terminals, for example, such as so-called PDAs (Personal Digital Assistants), notebook-sized personal computers, portable game machines, portable navigation terminals, and so forth, but also various stationary electronic devices.

Also, the description of the above embodiment is an example of the present disclosure. Accordingly, the present disclosure is not restricted to the above-described embodiment, and it goes without saying that various modifications can be made according to a design or the like without departing from the technical idea relating to the present disclosure.

Further, it is apparent that one skilled in the art can conceive various modifications, combinations, and other embodiments due to a design or other elements within the scope of the Claims of the present disclosure or equivalent to the Claims.

The invention claimed is:

1. An information processing apparatus comprising:
   a display that displays an image captured by a camera unit including an image sensor; and
   circuitry configured to
      control the camera unit to clip an image region having a size corresponding to a photography zoom power from the image captured by the camera unit;
      detect a user input, wherein the user input is a single continuous dragging gesture performed by the user's finger;
      control the camera unit to adjust center coordinates of a clipping position at a time of clipping the image region from the image without changing the photography zoom power by multiplying a parameter indicative of a movement of the user input by a predetermined scale factor; and
      control the display to display the clipped image region on the display.

2. The information processing apparatus of claim 1, wherein
   the circuitry controls the camera unit to adjust a movement amount of the center coordinates of the clipping position by a distance determined by multiplying a distance of movement of the user input by the predetermined scale factor.

3. The information processing apparatus of claim 1, wherein
   the circuitry controls the camera unit to adjust a movement amount of the center coordinate of the clipping position by a distance determined by multiplying a speed of movement of the user input by the predetermined scale factor.

4. The information processing apparatus of claim 1, wherein
   the circuitry controls the camera unit to adjust a movement amount of the center coordinates of the clipping position based on a length of time the user input is detected.

5. The information processing apparatus of claim 1, wherein
   at least one of a distance or speed of movement of the user input is represented as $(\Delta x1, \Delta y1)$, and
   the circuitry controls the camera unit to adjust the center coordinates of the clipping position from an initial position defined by $(0, 0)$ to a second position defined as $(-\alpha \Delta x1, -\alpha \Delta y1)$, where $\alpha$ represents the predetermined scale factor.

6. The information processing apparatus of claim 1, wherein the circuitry is configured to:
track movement of a reference image over a plurality of frames of image data captured by the camera unit; and
control the camera unit to adjust the center coordinates of the clipping position in each of the plurality of frames so that the image region in each of the plurality of frames corresponds to a position of the reference image in each of the plurality of frames.

7. The information processing apparatus of claim 6, wherein
the circuitry is configured to determine a reference image based on a user input received at a user interface of the information processing apparatus.

8. The information processing apparatus of claim 6, wherein
the plurality of frames are frames of a moving image constituting a preview image at a time of capturing a still image.

9. The information processing apparatus of claim 6, wherein
the circuitry controls the display to display a reduced size version of each of the plurality of frames.

10. The information processing apparatus of claim 9, wherein
the circuitry controls the display to display the image region within each of the plurality of frames.

11. The information processing apparatus of claim 10, wherein
the circuitry controls the display to display the tracking reference image within each of the plurality of frames.

12. The information processing apparatus of claim 1, wherein
the circuitry is configured to determines a distance between a subject photographed by the camera unit to the camera unit.

13. The information processing apparatus of claim 12, wherein
the circuitry is configured to control the camera unit to adjust a size of the image region clipped from the captured image based on the determined distance.

14. A method performed by an information processing apparatus, the method comprising:
controlling a display to display an image captured by a camera unit including an image sensor;
controlling the camera unit to clip an image region having a size corresponding to a photography zoom power from the image;
detecting a user input, wherein the user input is a simile continuous dragging gesture performed by the user's finger;
controlling the camera unit to adjust center coordinates of a clipping position at a time of clipping the image region from the image without changing the photography zoom power by multiplying a parameter indicative of a movement of the user input by a predetermined scale factor; and
controlling the display to display the clipped image region.

15. The method of claim 14, further comprising:
controlling the camera unit to adjust a movement amount of the center coordinates of the clipping position by a distance determined by multiplying a distance of movement of the user input by the predetermined scale factor.

16. The method of claim 14, further comprising:
controlling the camera unit to adjust a movement amount of the center coordinates of the clipping position by a distance determined by multiplying a speed of movement of the user input by the predetermined scale factor.

17. The method of claim 14, further comprising:
controlling the camera unit to adjust a movement amount of the center coordinates of the clipping position based on a length of time the user input is detected.

18. The method of claim 14, wherein
at least one of a distance or speed of movement of the user input is represented as ($\Delta$x1, $\Delta$y1), and
controlling the camera unit to adjust the center coordinates of the clipping position includes adjusting the center coordinates of the clipping position from an initial position defined by (0, 0) to a second position defined as ($-\alpha\Delta$x1, $-\alpha\Delta$y1), where $\alpha$ represents the predetermined scale factor.

19. A non-transitory computer-readable medium including computer-program instructions, which when executed by an information processing apparatus, cause the information processing apparatus to:
control a display to display, an image captured by a camera unit including an image sensor;
control the camera unit to clip an image region having a size corresponding to a photography zoom power from the image;
detect a user input, wherein the user input is a single continuous dragging gesture performed by the user's finger;
control the camera unit to adjust center coordinates of a clipping position at a time of clipping the image region from the image without changing the photography zoom power by multiplying a parameter indicative of a movement of the user input by a predetermined scale factor; and
control the display to display the clipped image region.

20. The non-transitory computer-readable medium of claim 19, wherein
at least one of a distance or speed of movement of the user input is represented as ($\Delta$x1, $\Delta$y1), and
controlling the camera unit to adjust the center coordinates of the clipping position includes adjusting the center coordinates of the clipping position from an initial position defined by (0, 0) to a second position defined as ($-\alpha\Delta$x1, $-\alpha\Delta$y1), where $\alpha$ represents the predetermined scale factor.

* * * * *